United States Patent
Kanno

(10) Patent No.: US 11,074,015 B2
(45) Date of Patent: Jul. 27, 2021

(54) MEMORY SYSTEM AND METHOD FOR CONTROLLING NONVOLATILE MEMORY BY A HOST

(71) Applicant: TOSHIBA MEMORY CORPORATION, Minato-ku (JP)

(72) Inventor: Shinichi Kanno, Ota (JP)

(73) Assignee: TOSHIBA MEMORY CORPORATION, Minato-ku (JP)

(*) Notice: Subject to any disclaimer, the term of this patent is extended or adjusted under 35 U.S.C. 154(b) by 49 days.

(21) Appl. No.: 16/564,396

(22) Filed: Sep. 9, 2019

(65) Prior Publication Data
US 2020/0241798 A1 Jul. 30, 2020

(30) Foreign Application Priority Data
Jan. 29, 2019 (JP) .............................. JP2019-013223

(51) Int. Cl.
*G06F 12/00* (2006.01)
*G06F 3/06* (2006.01)
(Continued)

(52) U.S. Cl.
CPC .......... *G06F 3/0659* (2013.01); *G06F 3/0604* (2013.01); *G06F 3/064* (2013.01); *G06F 3/0679* (2013.01)

(58) Field of Classification Search
CPC ...... G06F 3/0659; G06F 3/0679; G06F 3/064; G06F 3/0604
See application file for complete search history.

(56) References Cited

U.S. PATENT DOCUMENTS 6,292,392 B1   9/2001   Fukui
8,339,850 B2  12/2012   Tanizaki et al.
(Continued)

FOREIGN PATENT DOCUMENTS

| JP | 3611280 B2 | 1/2005 |
| JP | 2010-267341 A | 11/2010 |
| JP | 5529275 B2 | 6/2014 |

OTHER PUBLICATIONS

Neal Mielke, et al., "Recovery Effects in the Distributed Cycling of Flash Memories", 2006 IEEE Proceedings, 44th Annual International Reliability Physics Symposium, 2006, pp. 29-35.
(Continued)

*Primary Examiner* — Mark A Giardino, Jr.
(74) *Attorney, Agent, or Firm* — Oblon, McClelland, Maier & Neustadt, L.L.P.

(57) ABSTRACT

According to one embodiment, a memory system receives from a host read commands each designating both of a block address of a read target block and a read target storage location in the read target block, and executes a data read operation in accordance with each of the received read commands. In response to receiving from the host a first command to transition a first block to which data is already written to a reusable state of being reusable as a new write destination block, the memory system determine whether an incomplete read command designating a block address of the first block exists or not. In a case where the incomplete read command exists, the memory system executes the first command after execution of the incomplete read command is completed.

13 Claims, 20 Drawing Sheets

(51) Int. Cl.
   *G06F 13/00*      (2006.01)
   *G06F 13/28*      (2006.01)

(56) References Cited

U.S. PATENT DOCUMENTS

| | | |
|---|---|---|
| 8,850,103 B2 | 9/2014 | Bennett |
| 2012/0198174 A1* | 8/2012 | Nellans ................. G06F 3/0655 |
| | | 711/133 |
| 2018/0181303 A1* | 6/2018 | Hall ........................ G06F 3/064 |
| 2020/0257620 A1* | 8/2020 | Longnos ............... G06F 3/0679 |

OTHER PUBLICATIONS

Yiying Zhang, et al., "De-indirection for Flash-based SSDs with Nameless Writes", 10th USENIX Conference on File and Storage Technologies (FAST '12), 2012, pp. 1-16, https://www.usenix.org/system/file-s/conference/fast12/zhang.pdf.

* cited by examiner

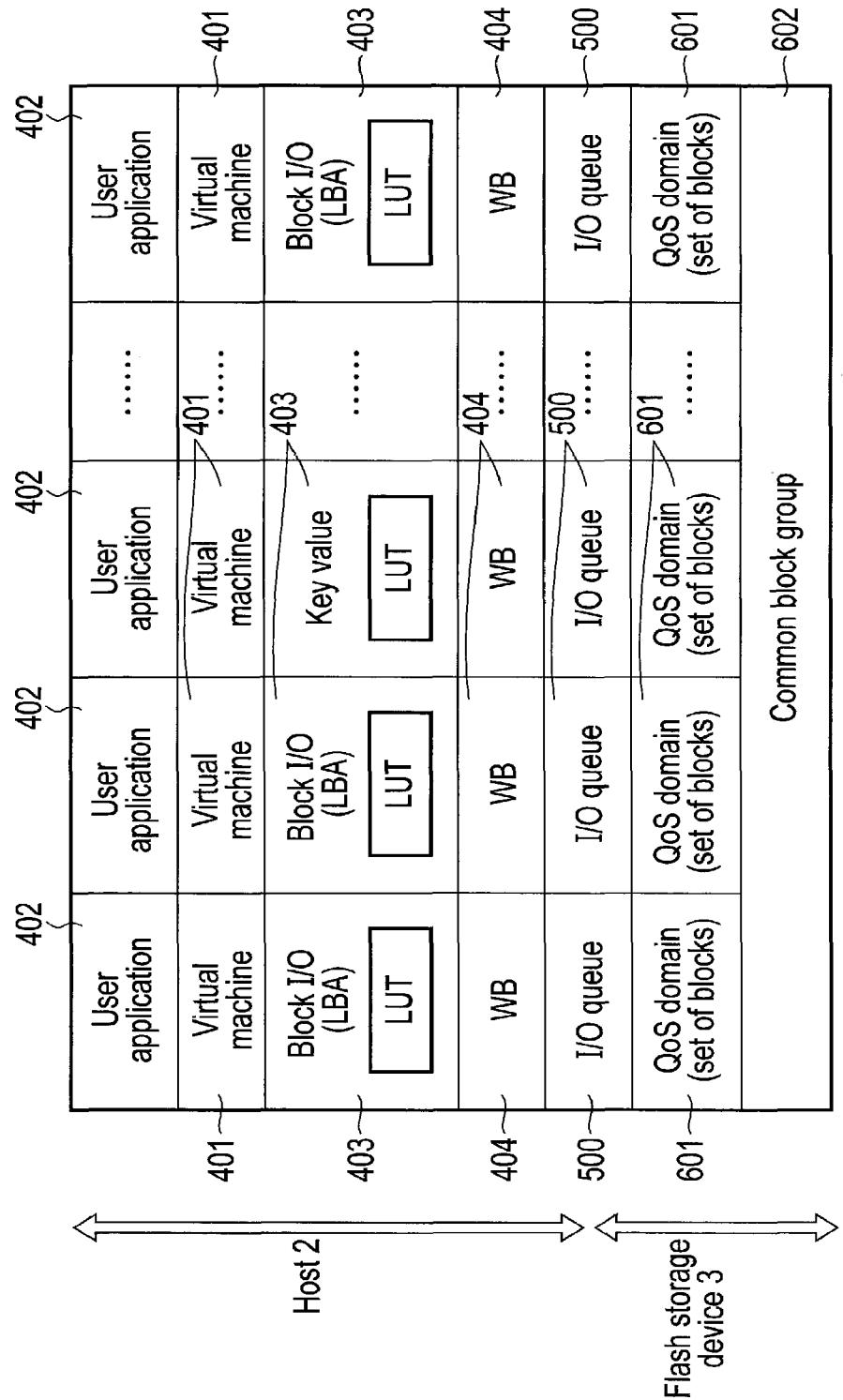
F I G. 2

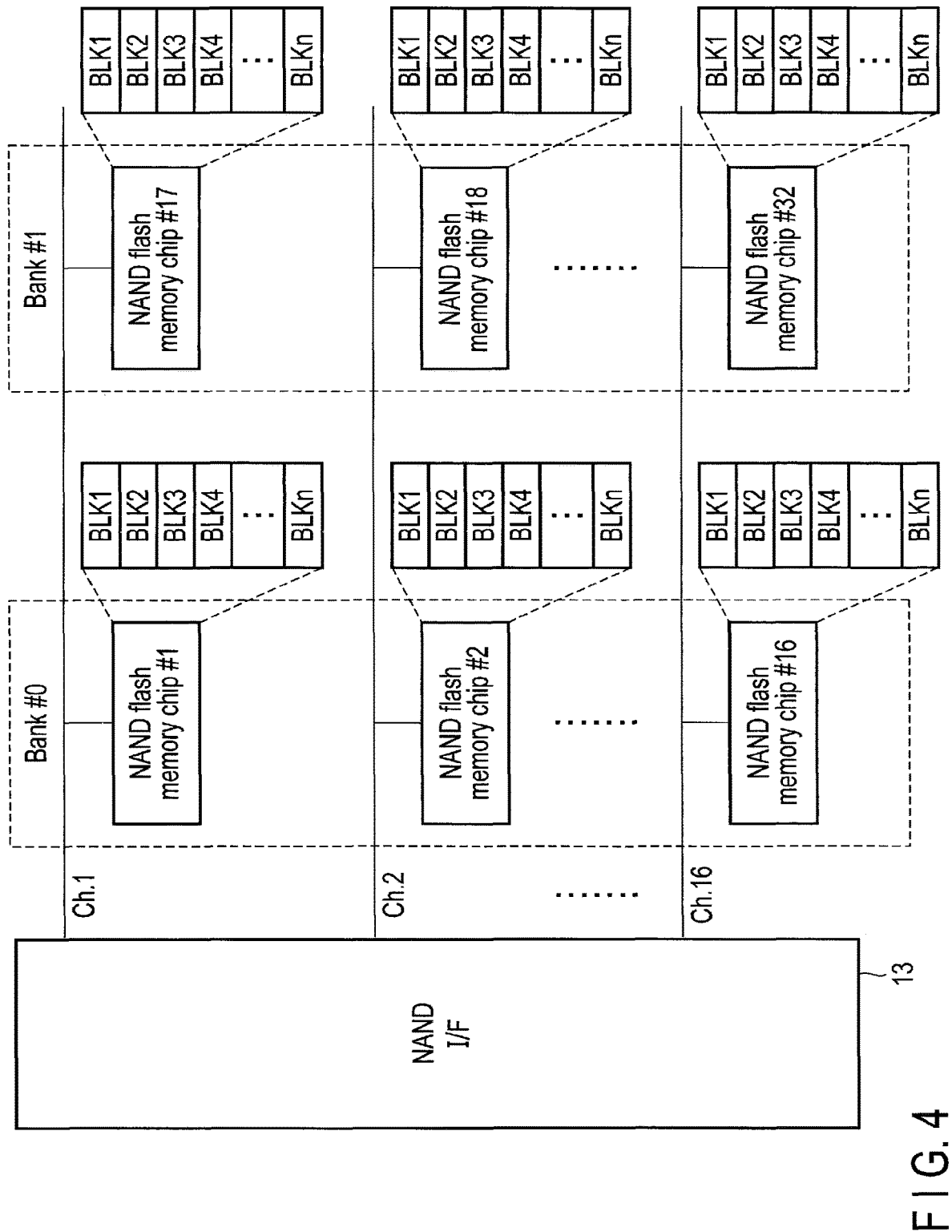
F I G. 4

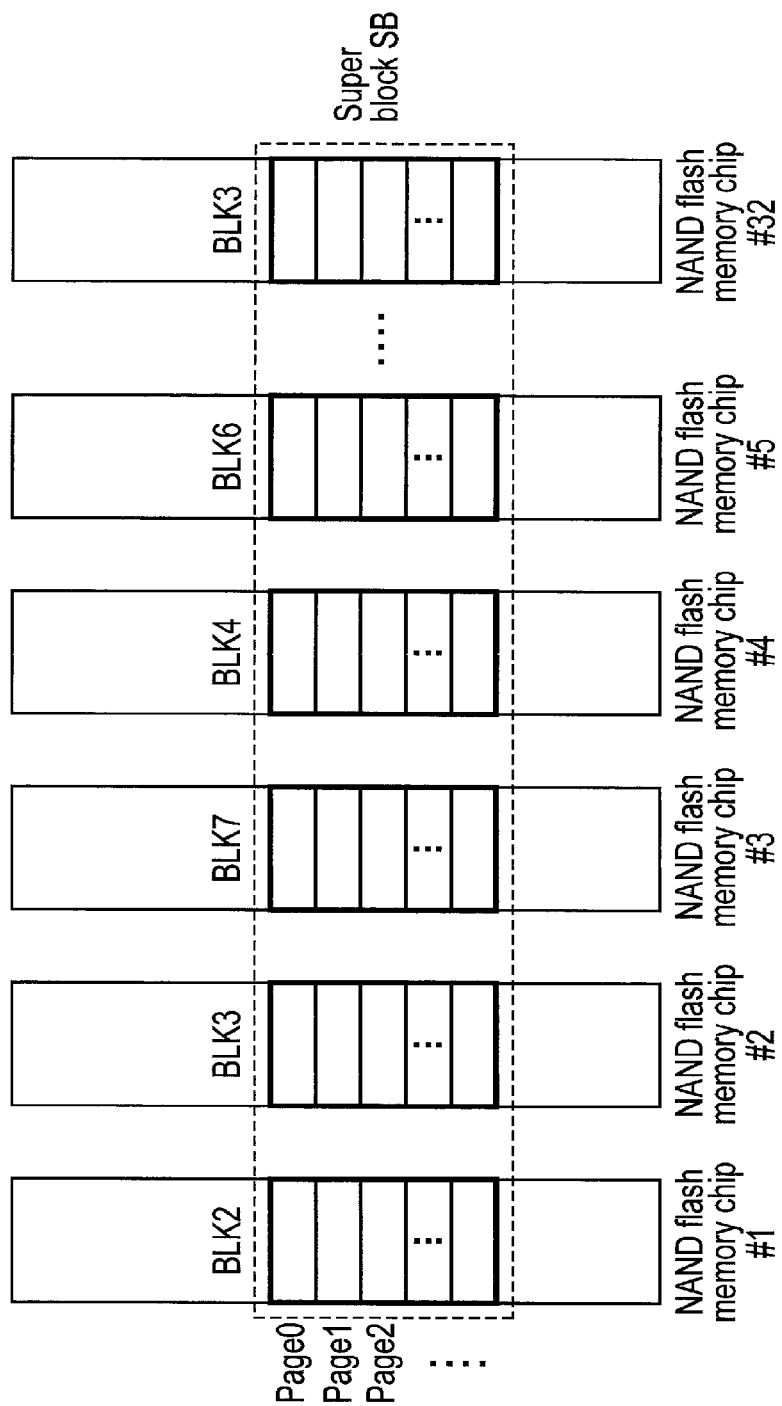
F I G. 5

Write command

|  | Descriptions |
|---|---|
| Command ID | Command ID for write command |
| QoS domain ID | Identifier of QoS domain to which data is to be written |
| Tag | Identifier of data to be written<br>(e.g., LBA, key of key value store, and hash value of key) |
| Length | Length of data to be written |
| Write buffer address | Location in write buffer where data to be written is stored |

F I G. 6

Address record request

|  | Descriptions |
|---|---|
| QoS domain ID | Identifier of QoS domain to which data is to be written |
| Tag | Identifiers of data to be written<br>(e.g., LBA, key of key value store, and hash value of key) |
| Physical address | Physical address is indicative of physical storage location to which data has been written.<br>Physical address is represented by block address and offset. |
| Length | Length of written data |

F I G. 7

Read command

|  | Descriptions |
|---|---|
| Command ID | Command ID for read command |
| QoS domain ID | Identifier of QoS domain where data to be read is stored |
| Physical address | Physical address is indicative of physical storage location where data to be read is stored. Physical address is represented by block address and offset. |
| Length | Length of data to be read |
| Read buffer address | Location in read buffer to which data is to be transferred |

FIG. 8

Reuse command

|  | Descriptions |
|---|---|
| Command ID | Command ID for reuse command |
| QoS domain ID | Identifier of QoS domain to which data to be returned to common flash block belongs |
| Physical address | Block address of reuse target block |

FIG. 9

QoS domain create command
|  | Descriptions |
|---|---|
| Command ID | Command ID for QoS domain create command |
| QoS domain ID | Identifier of QoS domain to be created |
| Capacity | Capacity of QoS domain to be created |
F I G. 10
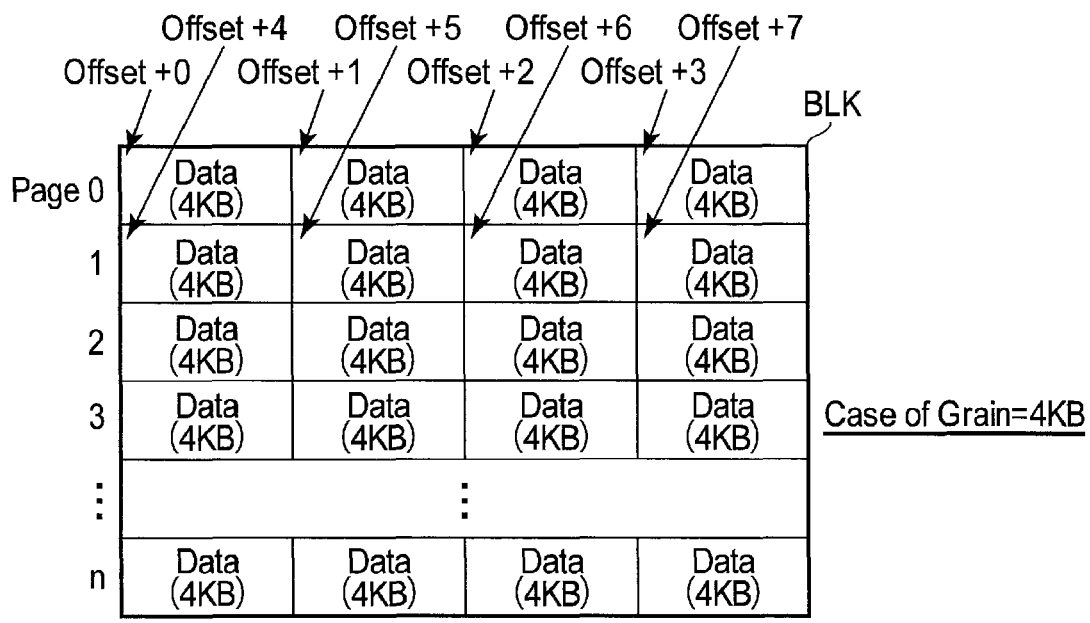
F I G. 11

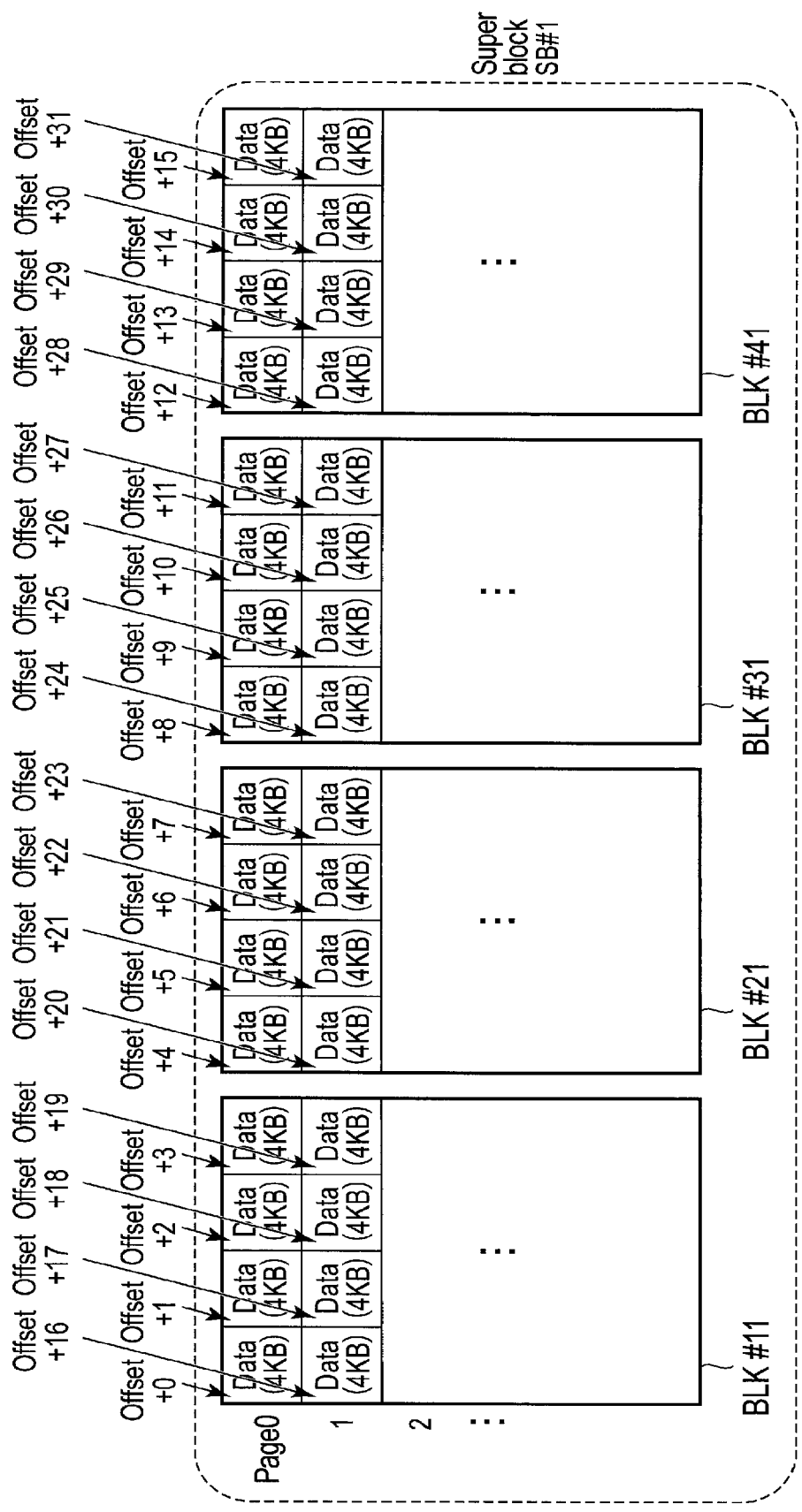
F I G. 12

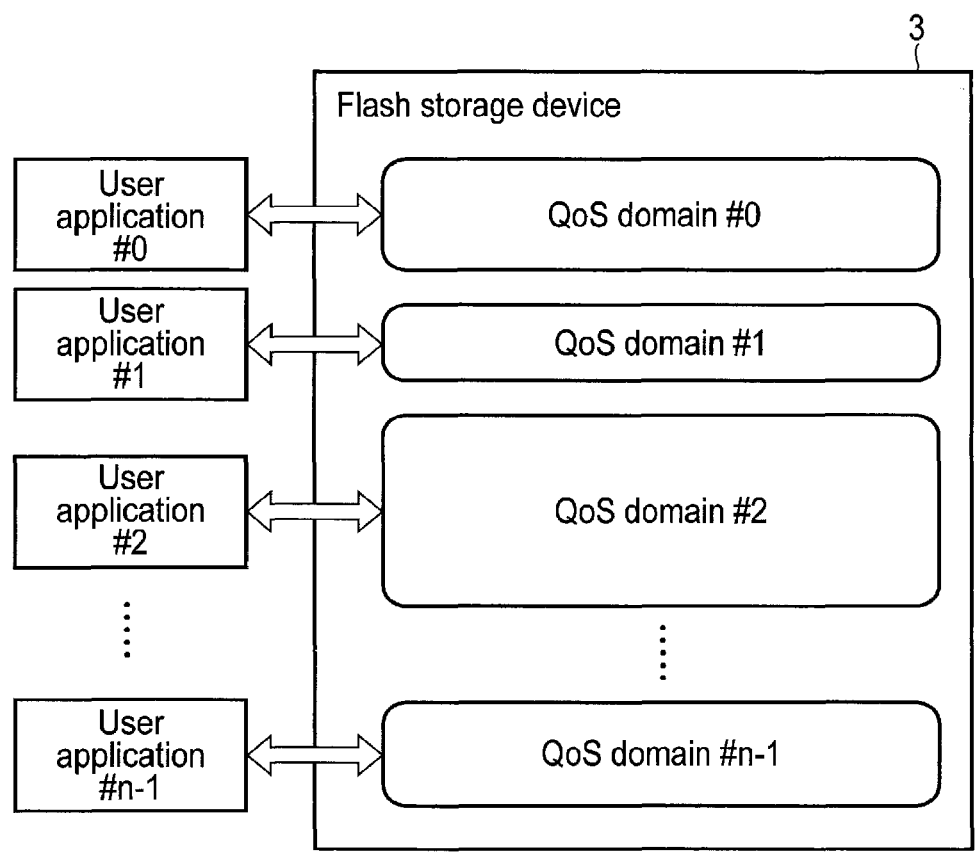
F I G. 13

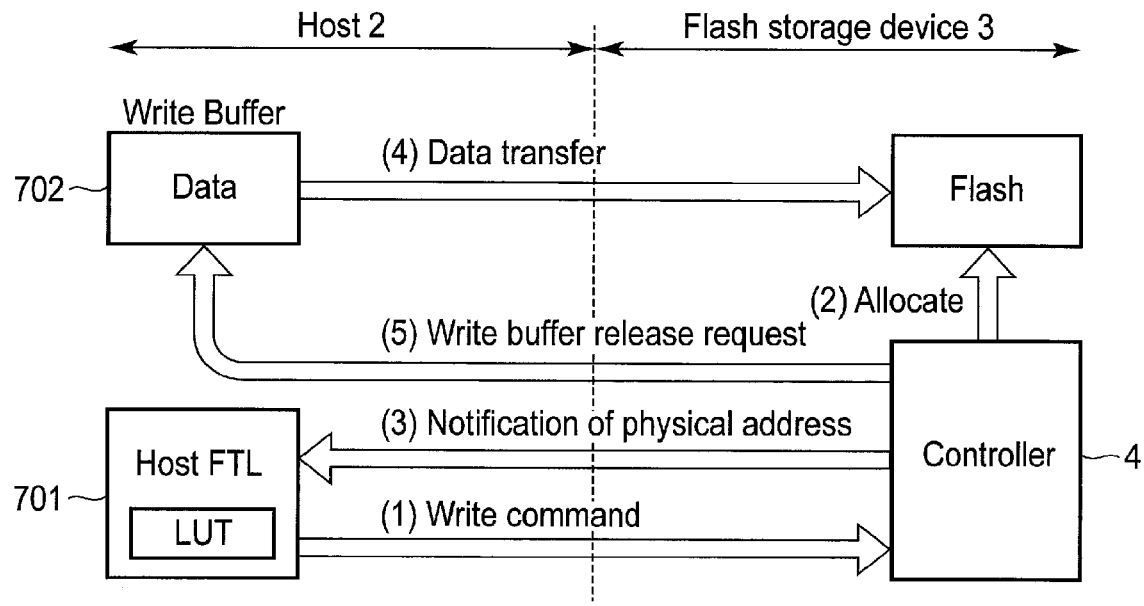
F I G. 14
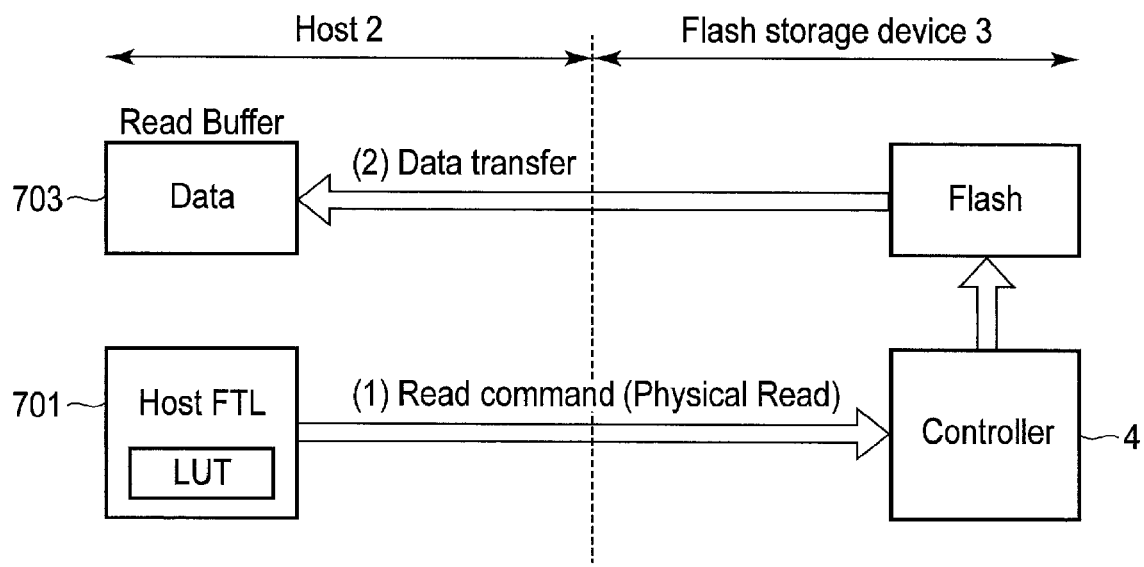
F I G. 15

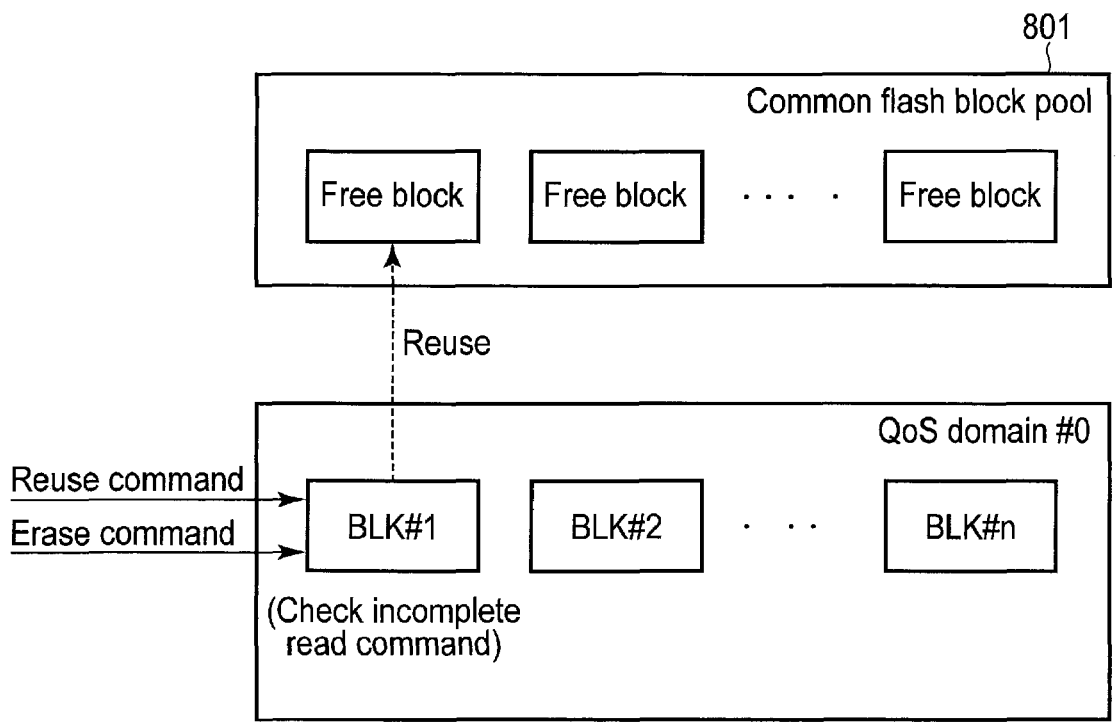
F I G. 17
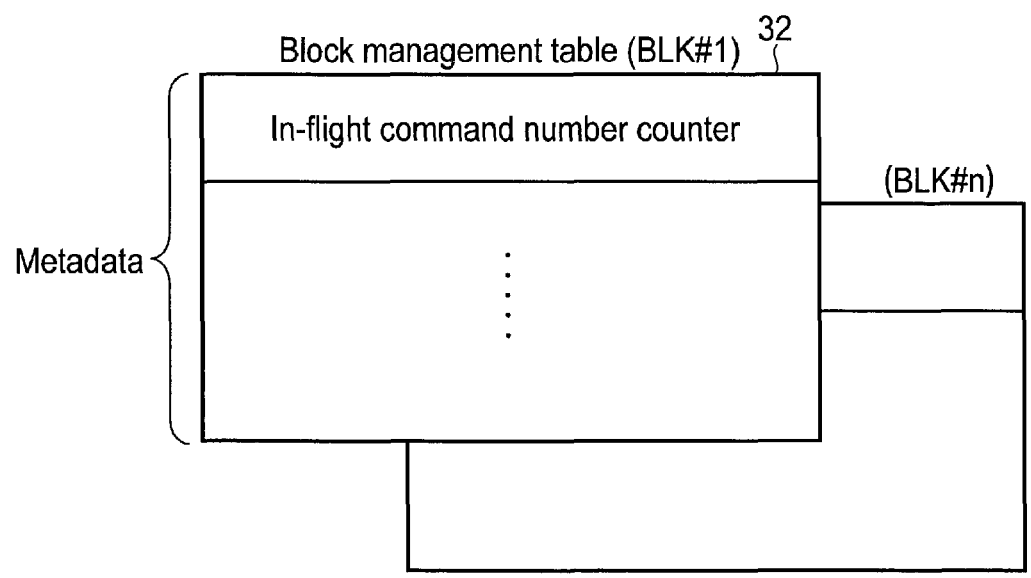
F I G. 18

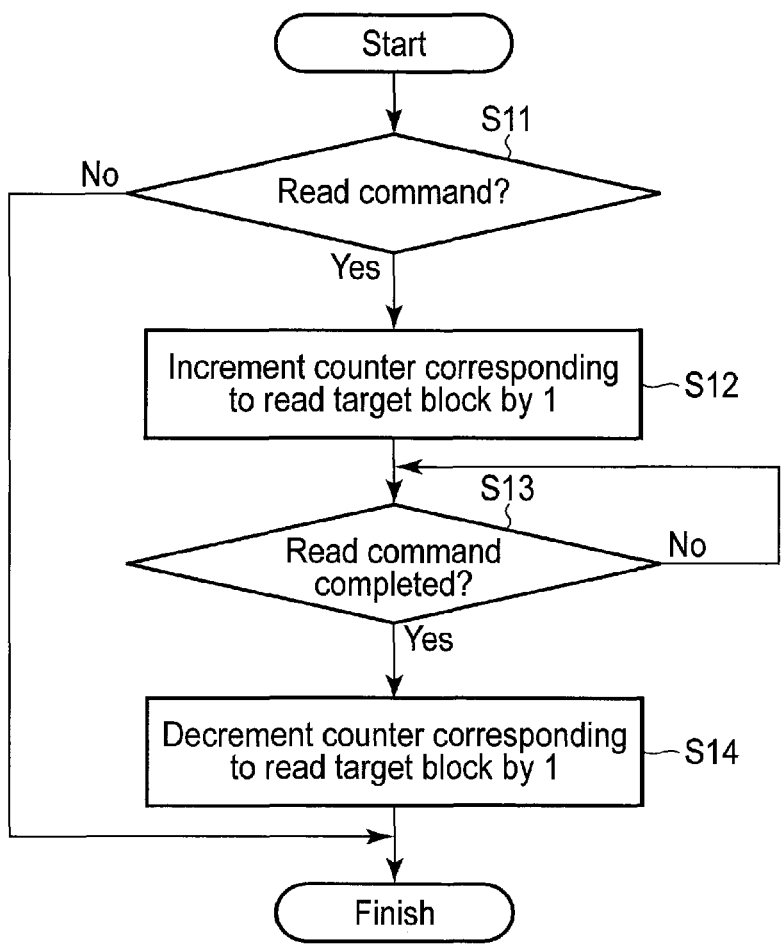
F I G. 19

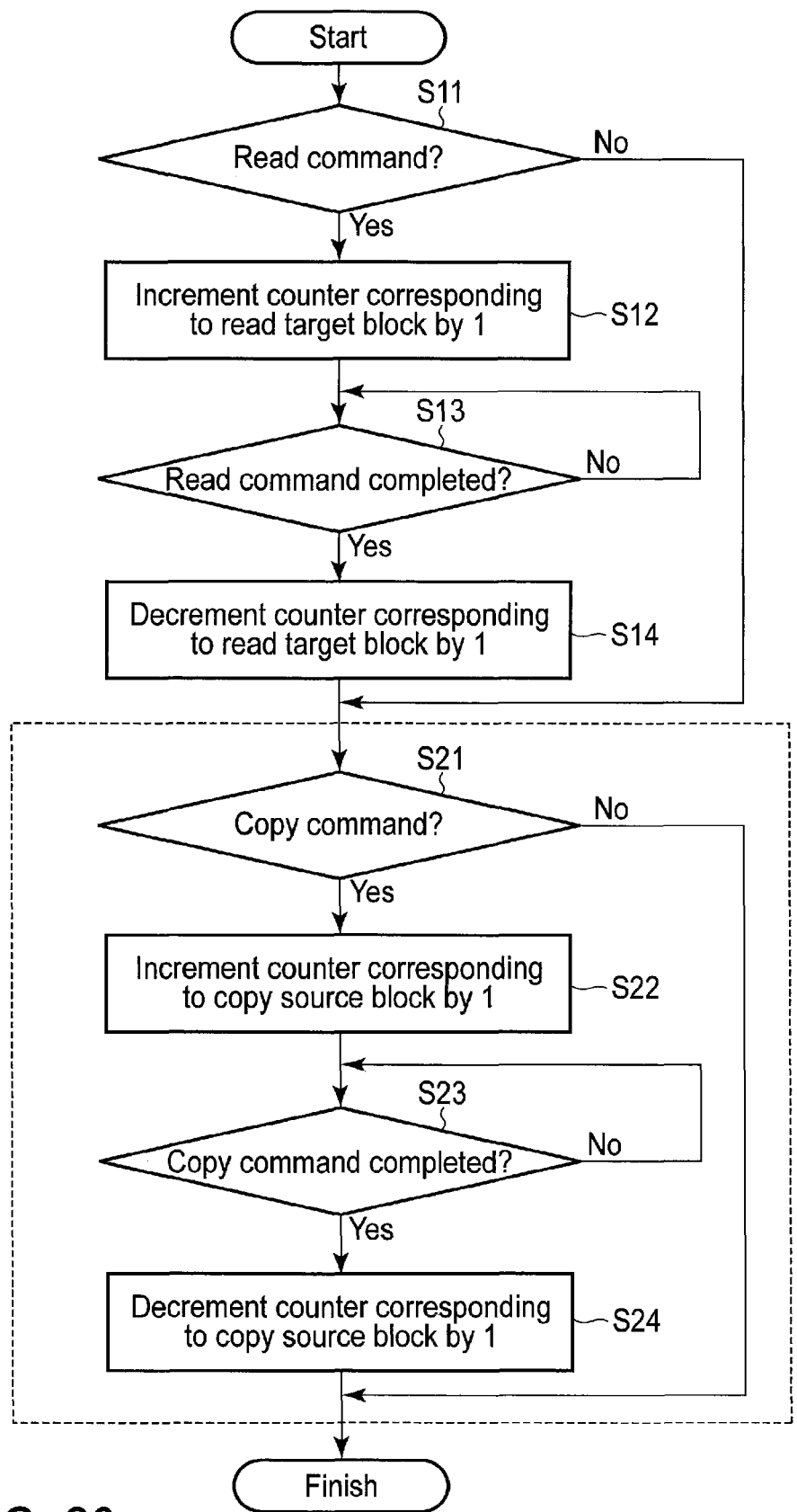
F I G. 20

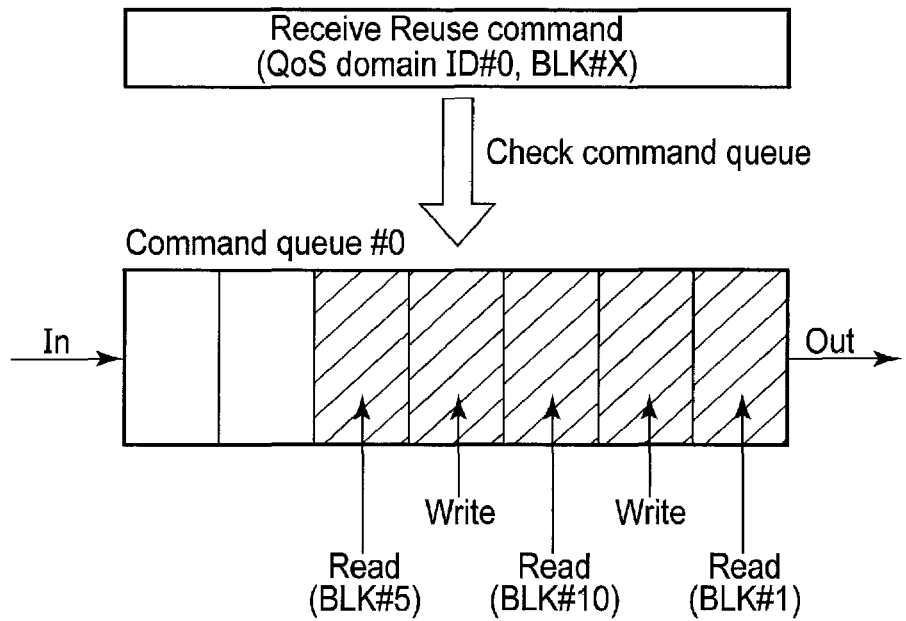
F I G. 21
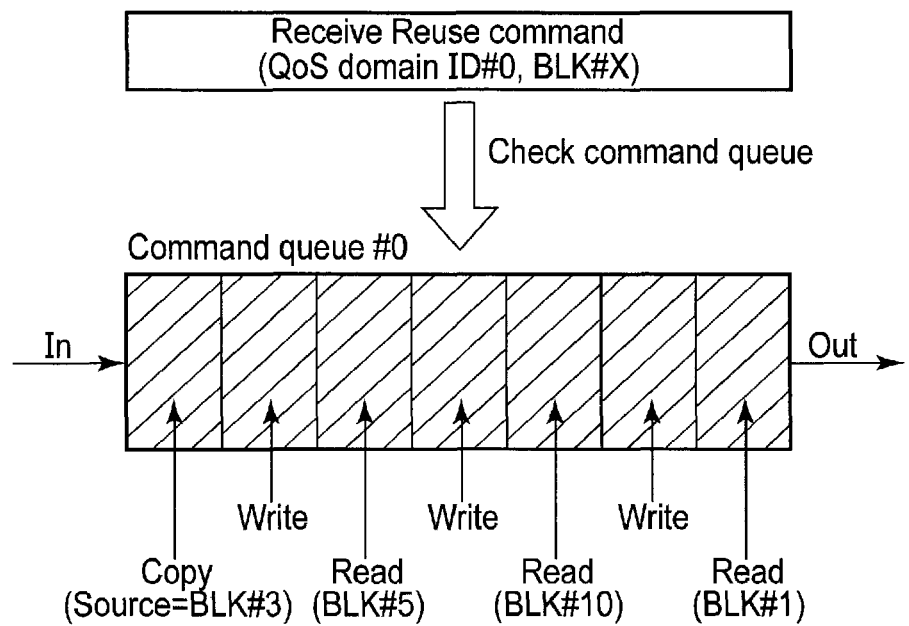
F I G. 22

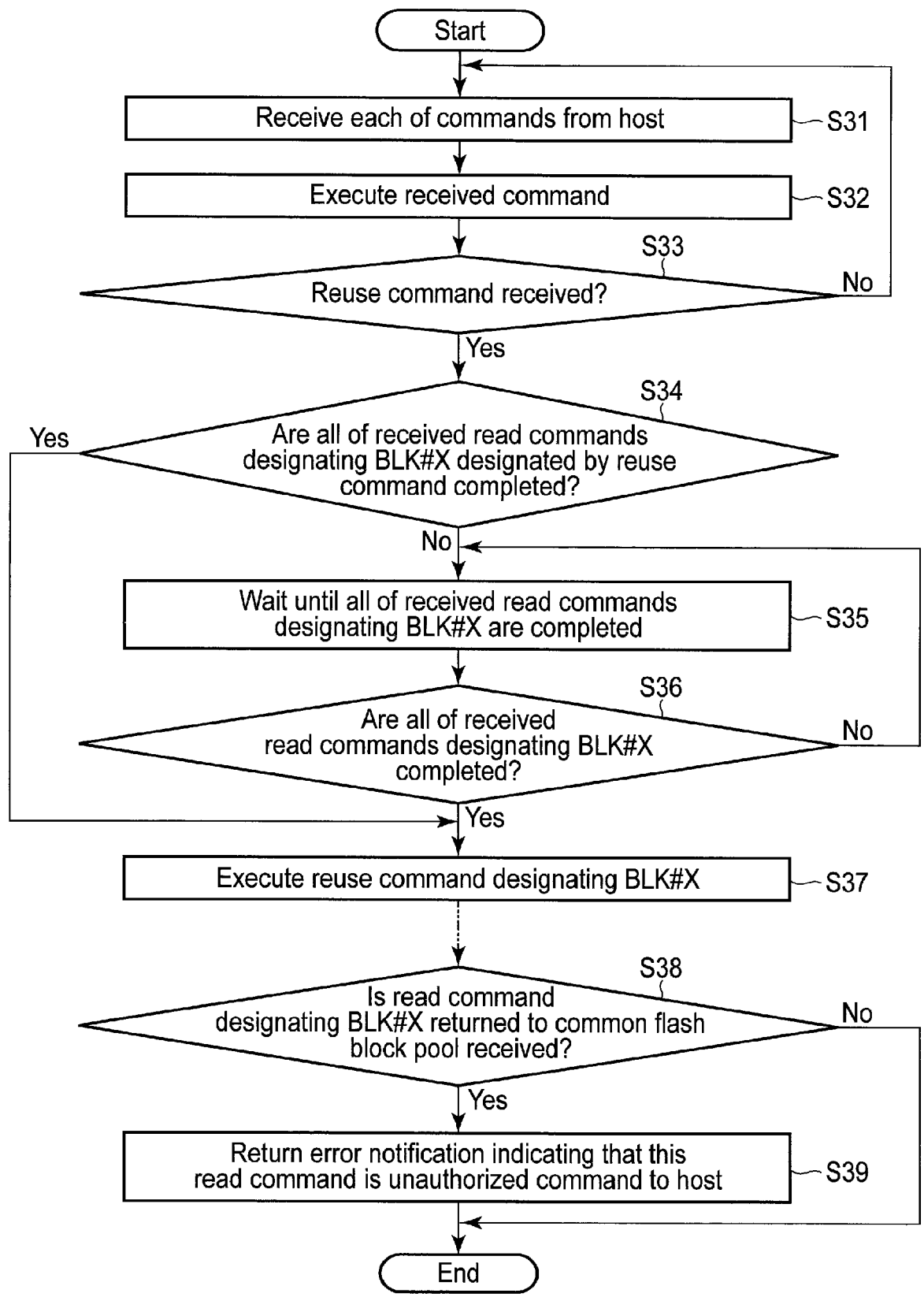
F I G. 23

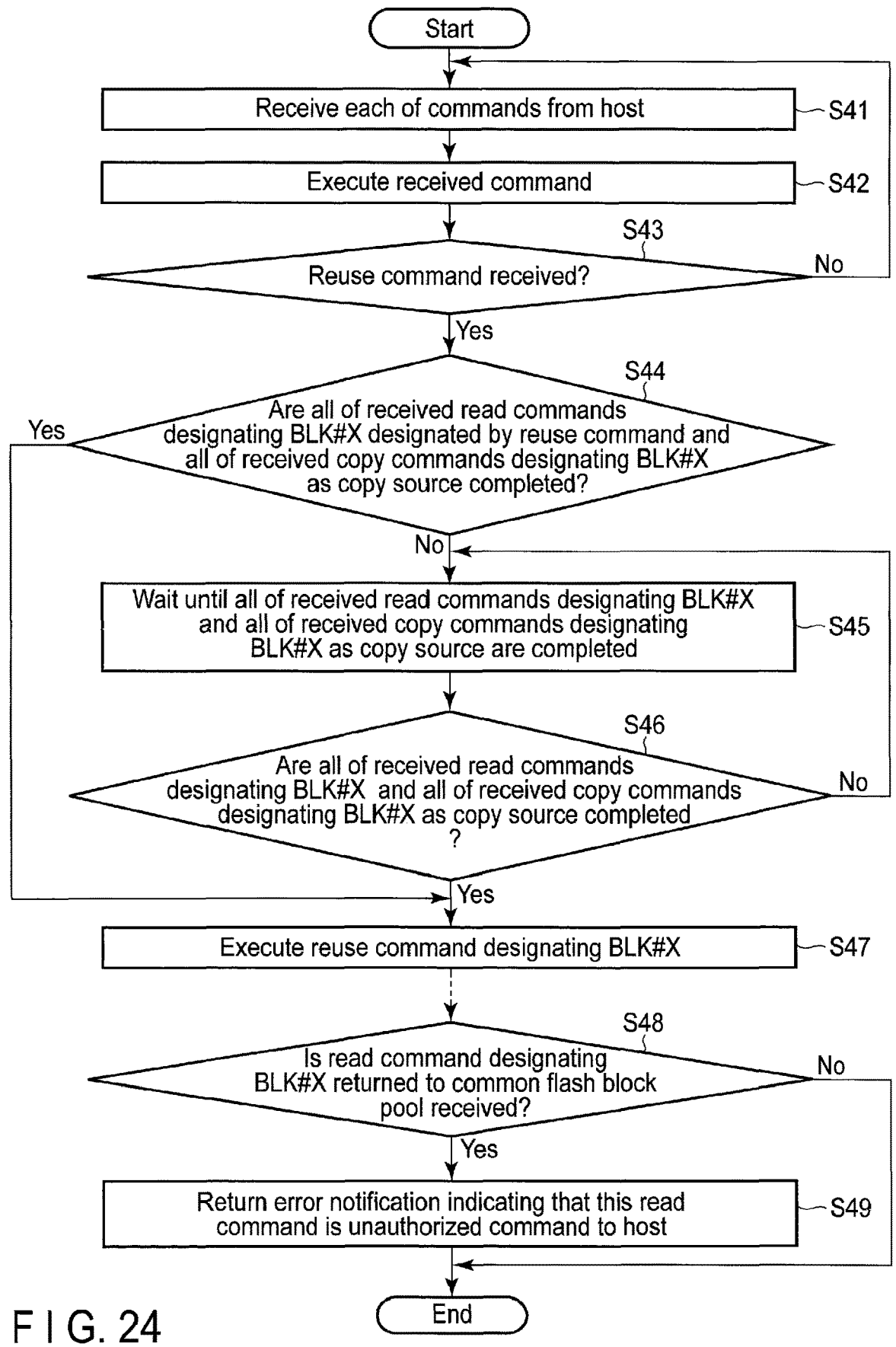
F I G. 24

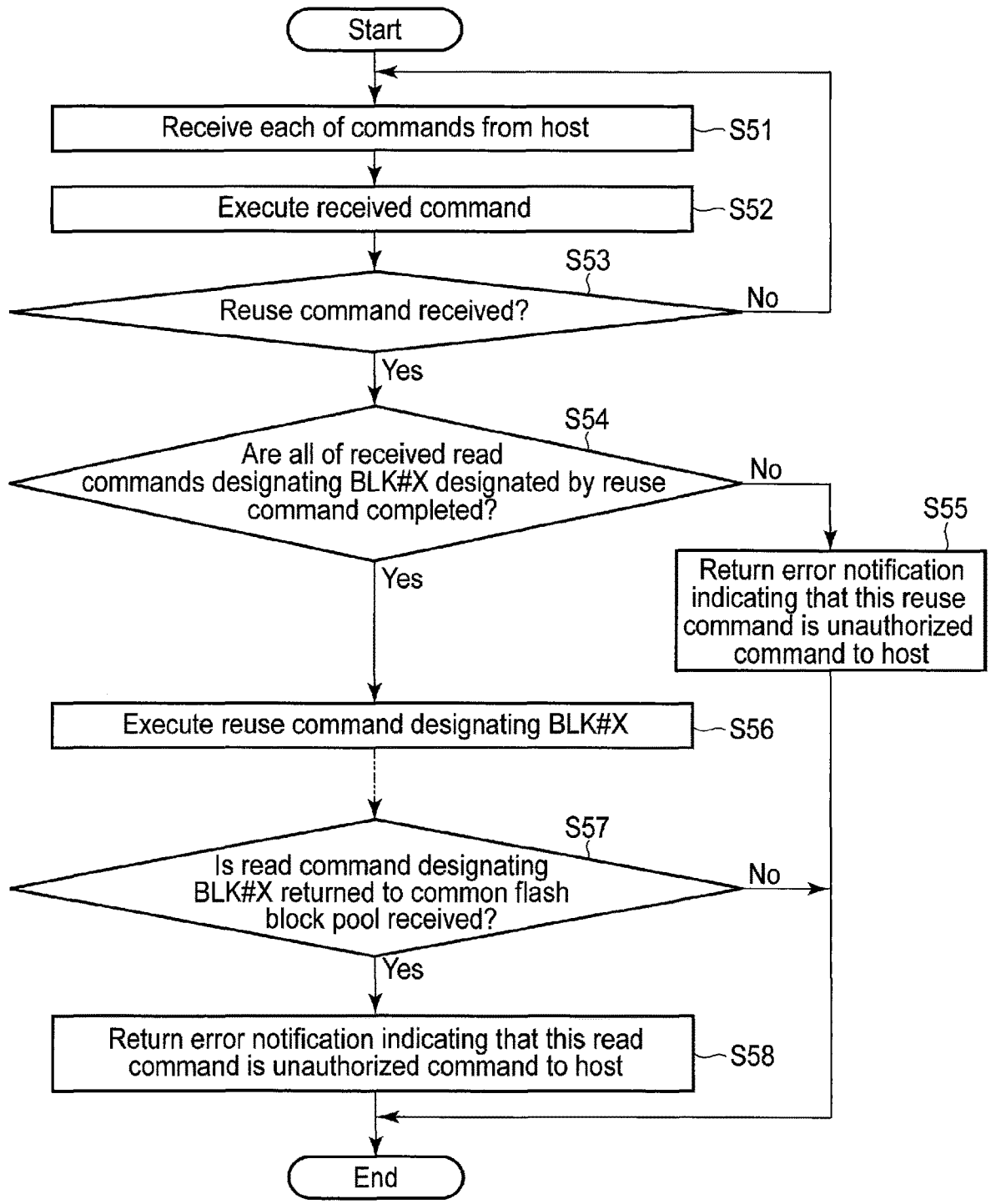
F I G. 25

MEMORY SYSTEM AND METHOD FOR CONTROLLING NONVOLATILE MEMORY BY A HOST

CROSS-REFERENCE TO RELATED APPLICATIONS

This application is based upon and claims the benefit of priority from Japanese Patent Application No. 2019-013223, filed Jan. 29, 2019, the entire contents of which are incorporated herein by reference.

FIELD

Embodiments described herein relate generally to technology of controlling a nonvolatile memory.

BACKGROUND

In recent years, memory systems comprising nonvolatile memories have been widely prevalent. As such a memory system, a solid state drive (SSD) based on a NAND flash technology is known.

In the server of a data center, too, an SSD is used as a storage device.

High I/O performance has been required for the storage device used in a host computing system such as a server.

For this reason, new technologies of enabling the host to directly control a nonvolatile memory in the storage device have been recently proposed.

However, if a configuration of enabling the host to directly control the nonvolatile memory in the storage device is adopted, the host-side burden for accessing the storage device may be increased and sufficient I/O performance may be unable to be thereby obtained. For this reason, implementation of new technologies of reducing the host-side burden is required.

BRIEF DESCRIPTION OF THE DRAWINGS

FIG. 2 is a diagram illustrating role sharing between the host and the memory system of the embodiment.

FIG. 4 is a block diagram illustrating a relationship between a NAND interface and plural NAND flash memory chips, which are provided in the memory system of the embodiment.

FIG. 5 is a block diagram illustrating a configuration example of one of blocks (super blocks) configured by plural physical block sets.

FIG. 6 is a diagram illustrating the write command applied to the memory system of the embodiment.

FIG. 7 is a diagram illustrating an address record request sent to the host from the memory system of the embodiment.

FIG. 8 is a diagram illustrating a read command applied to the memory system of the embodiment.

FIG. 9 is a diagram illustrating a reuse command applied to the memory system of the embodiment.

FIG. 10 is a diagram illustrating a quality-of-service (QoS) domain create command applied to the memory system of the embodiment.

FIG. 11 is a block diagram illustrating block addresses and offsets defining physical addresses included in each of the address record request and the read command.

FIG. 12 is a block diagram illustrating a relationship between block addresses and offsets in a case where a superblock is used.

FIG. 13 is a block diagram illustrating plural QoS domains managed by the memory system of the embodiment.

FIG. 14 is a block diagram illustrating data write processing executed by the host and the memory system of the embodiment.

FIG. 15 is a block diagram illustrating data read processing executed by the host and the memory system of the embodiment.

FIG. 17 is a block diagram illustrating an operation of transitioning a block designated by a reuse command (or an erase command) received from the host to a state of being reusable as a new write destination block.

FIG. 18 is a block diagram illustrating a block management table including a command number counter, which is managed for each block by the memory system of the embodiment.

FIG. 19 is a flowchart illustrating a procedure of command number counter update processing executed by the memory system of the embodiment.

FIG. 20 is a flowchart illustrating another procedure of the command number counter update processing executed by the memory system of the embodiment.

FIG. 21 is a block diagram illustrating a command queue check operation executed by the memory system of the embodiment to determine whether an uncompleted read command designating a block address of the same block as the block designated by the reuse command exists or not.

FIG. 22 is a block diagram illustrating another command queue check operation executed by the memory system of the embodiment to determine whether an uncompleted read command designating a block address of the same block as the block designated by the reuse command exists or not.

FIG. 23 is a flowchart illustrating a procedure of processing executed by the memory system of the embodiment in a case of receiving the reuse command from the host.

FIG. 24 is a flowchart illustrating another procedure of processing executed by the memory system of the embodiment in a case of receiving the reuse command from the host.

FIG. 25 is a flowchart illustrating yet another procedure of processing executed by the memory system of the embodiment in a case of receiving the reuse command from the host.

DETAILED DESCRIPTION

Various embodiments will be described hereinafter with reference to the accompanying drawings.

In general, according to one embodiment, a memory system connectable to a host comprises a nonvolatile memory including a plurality of blocks, and a controller. The controller is electrically connected to the nonvolatile memory, and is configured to receive from the host read commands each designating both of a block address of a read target block of the blocks and a read target storage location in the read target block, and to execute a data read operation in accordance with each of the received read commands. In response to receiving from the host a first command to transition a first block to which data is already written to a reusable state of being reusable as a new write destination block, the controller determines whether an incomplete read command already received from the host and designating a block address of the first block exists or not. In a case where the incomplete read command designating the block address of the first block exists, the controller executes the first command after execution of the incomplete read command designating the block address of the first block is completed.

Figure 1:
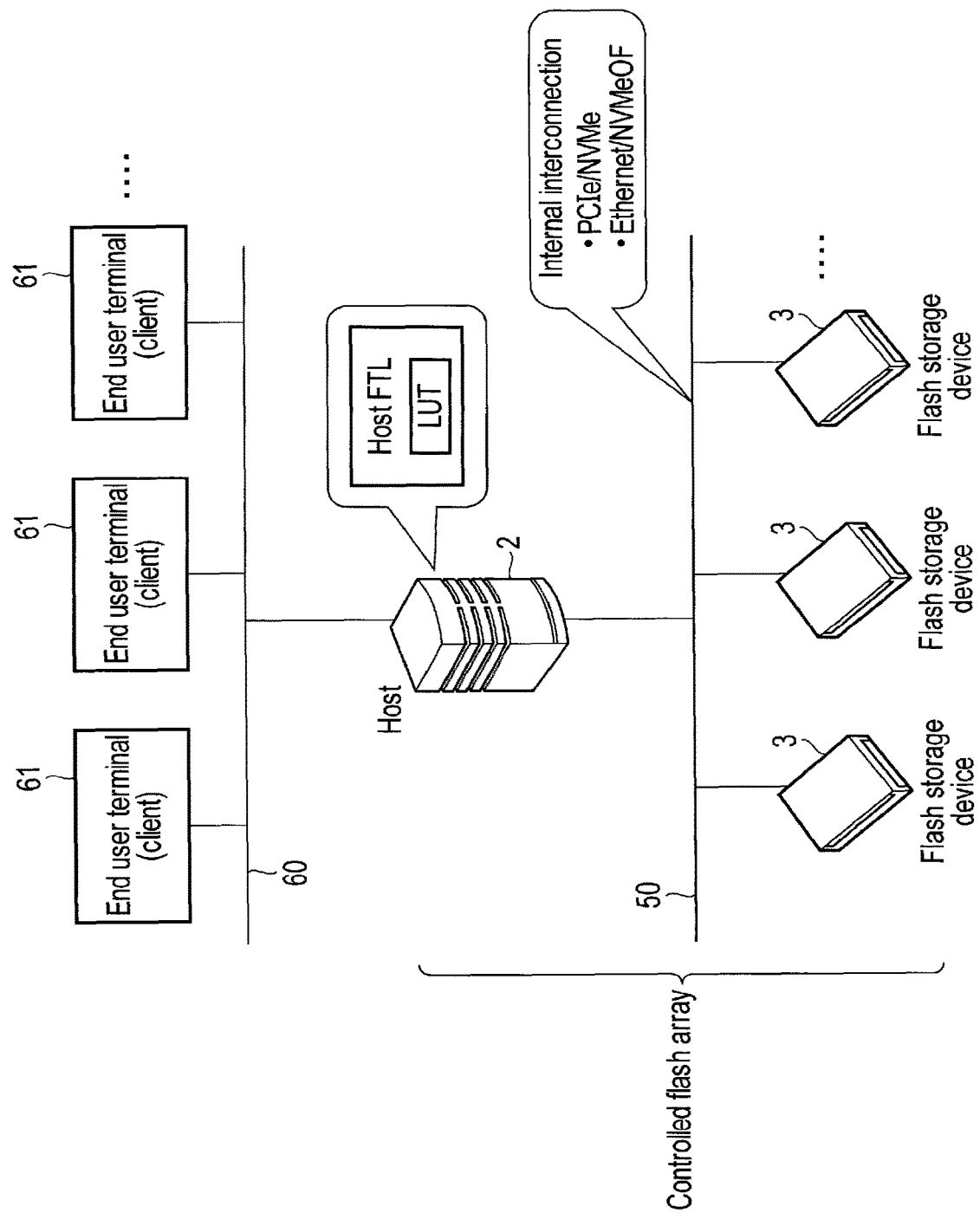
FIG. 1 is a block diagram illustrating a relationship between a host and a memory system according to an embodiment.

First, a relationship between a host and a memory system of the embodiment will be described with reference to FIG. 1.

The memory system is a semiconductor storage device configured to write data to a nonvolatile memory and to read data from the nonvolatile memory. The memory system is implemented as a flash storage device 3 based on the NAND flash technology.

The host (host device) 2 is configured to control plural flash storage devices 3. The host 2 is implemented by an information processing apparatus configured to use a flash array composed of plural flash storage devices 3 as a storage. This information processing apparatus may be a personal computer or a server computer.

The flash storage device 3 may be utilized as one of plural flash storage devices provided in the storage array. The storage array may be connected to the information processing apparatus such as a server computer via a cable or a network. The storage array comprises a controller which controls plural storages (for example, plural flash storage devices 3) in the storage array. If the flash storage devices 3 are applied to the storage array, the controller of the storage array may function as the host of the flash storage devices 3.

An example of a case where the information processing apparatus such as a server computer functions as the host 2 will be described below.

The host (server) 2 and plural flash storage devices 3 are interconnected via an interface 50 (internal interconnection). The interface 50 for interconnection is not limited to this, but, PCI Express (PCIe) (registered trademark), NVM Express (NVMe) (registered trademark), Ethernet (registered trademark) or NVMe over Fabrics (NVMeOF) and the like can be used as the interface.

A typical example of the server computer which functions as the host 2 is a server computer (hereinafter called a server) in a data center.

In a case where the host 2 is implemented by the server in the data center, the host (server) 2 may be connected to plural end user terminals (clients) 61 via a network 60. The host 2 can provide various services to the end user terminals 61.

Examples of the services which can be provided by the host (server) 2 are (1) Platform as a Service (PaaS) which provides a system running platform to each client (each end user terminal 61), (2) Infrastructure as a Service (IaaS) which provides an infrastructure such as a virtual server to each client (each end user terminal 61), and the like.

Plural virtual machines may be executed on a physical server which functions as the host (server) 2. Each of the virtual machines running on the host (server) 2 can function as a virtual server configured to provide various services to clients (end user terminals 61) corresponding to the virtual machines. An operating system and a user application, which are used by the end user terminal 61 corresponding to the virtual machine, are executed in each of the virtual machines.

A flash translation layer (host FTL) is also executed in the host (server) 2. The host FTL includes a lookup table (LUT), which is an address translation table managing mapping between each of data identifiers (tags) to identify access target data and each of physical addresses of the nonvolatile memory in the flash storage device 3. The host FTL can recognize data placement on the nonvolatile memory in the flash storage device 3 by using the LUT.

The flash storage device 3 comprises a nonvolatile memory such as a NAND flash memory. The nonvolatile memory includes plural blocks each including plural pages. Each of the blocks is a unit of erasing the data, and each of the plural pages is a unit of data write and data read.

The flash storage device 3 can execute low-level abstraction. The low-level abstraction is a function for abstraction of the nonvolatile memory. The low-level abstraction includes a function of assisting the data placement and the like. The example of the function of assisting the data placement may include a function of allocating the write destination block to which the user data is to be written from the host 2, a function of determining the write destination location (write destination block and location in the write destination block) of the user data, a function of notifying an upper layer (host 2) of the write destination location (block address and offset) to which the user data is written, and the like.

In addition, the example of the function of assisting the data placement may include a function of allocating the copy destination block to which the user data already written to the nonvolatile memory is to be copied, a function of determining the copy destination location (copy destination block and location in the copy destination block) of the user data, a function of notifying the upper layer (host 2) of the copy destination location (block address and offset) to which the user data is copied, and the like.

The flash storage device 3 executes various commands received from the host 2. These commands include a write command to write the data to the nonvolatile memory in the flash storage device 3 and a read command to read the data from the nonvolatile memory. In the embodiment, each of the read commands designates a physical address indicative of the storage location in which the data to be read is stored. This physical address is indicated by a block address of a read target block and an offset (block offset) indicative of a read target storage location in the read target block.

The flash storage device 3 receives from the host 2 each read command designating the block address of the read target block and the offset indicative of the read target storage location in the read target block and executes the data read operation in response to each of the received read commands.

FIG. 2 illustrates role sharing between the host 2 and the flash storage device 3.

In the host (server) 2, plural virtual machines 401 corresponding to plural end users, respectively, are executed. An operating system and a user application 402, which are used by the corresponding end user, are executed in each of the virtual machines 401.

In addition, plural I/O services 403 corresponding to plural user applications 402, respectively, are executed in the host (server) 2. The I/O services 403 may include logical block address (LBA)-based block I/O service, key-value store service, and the like. Each of the I/O services 403 includes a lookup table (LUT) which manages mapping between each of the tags and each of the physical addresses of the flash storage device 3.

The tag is indicative of an identifier which can identify access target data. A typical example of the tag is not limited to this but is a logical address such as LBA. Alternatively, a key of a key-value store, a hash value of this key, or the like may be used as the tag.

The physical address of the flash storage device 3 is an address for identifying a storage location (physical storage location) in the nonvolatile memory incorporated in the flash storage device 3.

In the LBA-based block I/O service, LUT which manages mapping between each of the logical addresses (LBAs) and each of the physical addresses of the flash storage device 3 may be used.

In contrast, in the key-value store service, LUT which manages mapping among each of keys (hash values of the keys), each of the physical addresses of the flash storage devices 3 storing the data corresponding to these keys, and each of data lengths of the data corresponding to the keys, may be used.

Each of the end users can select an addressing method (LBA, the key of the key-value store, the hash value of the key, or the like) to be used.

In the host (server) 2, plural write buffers (WB) 404 corresponding to the plural virtual machines 401, respectively, may be managed. Write data from a certain user application 402 may be temporarily stored in the write buffer (WB) 404 for the virtual machine 401 corresponding to the user application 402.

Transmission of the command from the host (server) 2 to the flash storage device 3 and return of a response of command completion or the like from the flash storage device 3 to the host (server) 2 are executed via an I/O queue 500 which exists in each of the host (server) 2 and the flash storage devices 3.

The flash storage device 3 manages each of plural regions obtained by logically dividing the nonvolatile memory in the flash storage device 3, as QoS domain 601. Each of the QoS domains 601 is a subset of the plural blocks included in the nonvolatile memory. Each of the plural blocks included in the nonvolatile memory belongs to only one QoS domain 601 but the same block does not simultaneously belong to different QoS domains 601.

The QoS domains 601 are identified by identifiers called QoS domain IDs, respectively. The QoS domain IDs are used as plural identifiers for access to the plural regions (plural QoS domains), respectively.

In the embodiment, each write command designates the identifier (QoS domain ID) of the region (QoS domain) to which the data is to be written. When the flash storage device 3 receives a write command designating a certain QoS domain ID from the host 2, the flash storage device 3 selects one block of the common block group 602 shared by the plural QoS domains 601 and allocates the selected block as a write destination block for the QoS domain having this QoS domain ID.

The write destination block is indicative of the block to which the data is to be written. The common block group 602 is a common block group including a set of free blocks shared by the plural QoS domains 601.

The free block is indicative of a block in a status (free status) of being capable of being reused (reallocated) as a new write destination block. A typical example of the free block is a block where no valid data is stored. The valid data is indicative of the latest data associated with a tag such as LBA. In other words, the data linked to LUT of the host as the latest data is the valid data. In addition, invalid data is indicative of the data which is not associated with the tag such as LBA. The data which is not linked to LUT of the host 2 is the invalid data. For example, if updated data corresponding to certain LBA is written to the flash storage device 3, previous data corresponding to the LBA becomes invalid data.

The flash storage device 3 writes data associated with the received write command to the write destination block allocated to the QoS domain. If a usable write destination block is already allocated for this QoS domain, the above-described operation of allocating one block (free block) of the blocks of the common block group 602 as the write destination block for the QoS domain does not need to be executed. The flash storage device 3 writes the data associated with the received write command to a next usable page in the already allocated write destination block.

When the data associated with the received write command is written to the write destination block, the flash storage device 3 sends to the host 2 a tag of this data and a physical address (block address and offset) indicative of the storage location in the nonvolatile memory to which the data is written as an address record request. The block address is an identifier for identifying the write destination block. Since the nonvolatile memory is generally composed of plural nonvolatile memory chips, a block address of a certain block may be indicated by a chip number of the nonvolatile memory and a block number in the chip. The offset is indicative of a storage location in the write destination block.

The host 2 can update LUT such that the physical address (block address and offset) is associated with the tag of the data, in response to the address record request.

As regards each of the blocks included in each QoS domain, the host 2 can determine whether data stored in each block is valid data or invalid data by using the LUT. In addition, the host 2 can transmit a command to transition a block to which the data is already written to a reusable state (free block) of being reusable as a new write destination block, to the flash storage device 3. This command is used to return one block allocated from the free block group, as a free block, to the free block group. That is, this command is used to return the block to the free block group for the purpose of transitioning the block allocated from the free block group to the state of being reusable as a new write destination block.

For example, if all data in one block to which data is already written becomes invalid data by data update, the host 2 may transmit a command to transition this block to a reusable state (free block), to the flash storage device 3. Alternatively, if all data in a copy source block becomes invalid data by the data copy operation, the host 2 may transmit the command to transition the copy source block to a reusable state (free block) of being reusable as a new write destination block, to the flash storage device 3.

In the embodiment, the reuse command can be used as the dedicated command to transition a block to which the data is already written to a reusable state (free block) of being reusable as a new write destination block.

This reuse command is a command to return one of the blocks allocated to a specific QoS domain as write destination blocks to the common block group 602 and to set the block to be reusable as a new write destination block for any QoS domain. This reuse command designates an identifier (QoS domain ID) of a specific region (QoS domain) and a block address of the block which is to be returned to the common block group 602. The block designated by the reuse command is returned to the common block group 602 as a free block. The returned block can be reused (reallocated) as a new write destination block for any QoS domain after the erase operation for this block is executed.

In addition, an erase command to execute an erase operation for a specific block may be used as a command to transition a block to the reusable state (free block). The erase command may also include the QoS domain ID and the block address. The block designated by the erase command has its erase operation executed and is returned to the common block group 602 as a free block. This block can also be reused (reallocated) as a new write destination block for an optional QoS domain.

Figure 3:
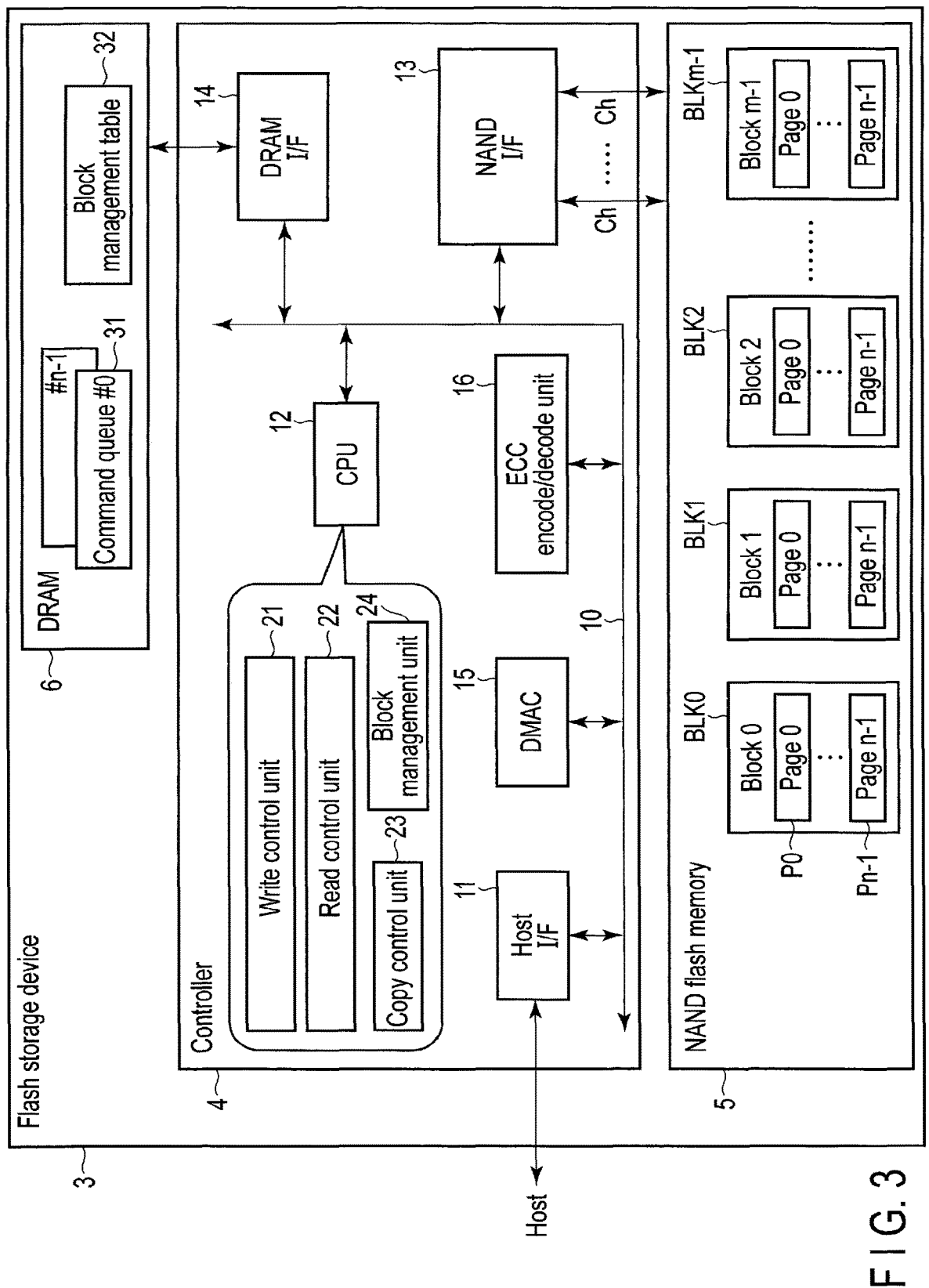
FIG. 3 is a block diagram illustrating a configuration example of the memory system of the embodiment.

FIG. 3 illustrates a configuration example of the flash storage device 3.

The flash storage device 3 comprises a controller 4 and a nonvolatile memory (NAND flash memory) 5. The flash storage device 3 may also comprise a random access memory, for example, DRAM 6.

The NAND flash memory 5 comprises a memory cell array comprising plural memory cells arranged in a matrix. The NAND flash memory 5 may be a flash memory having a two-dimensional structure or a flash memory having a three-dimensional structure.

The memory cell array of the NAND flash memory 5 includes plural blocks BLK0 to BLKm−1. Each of the blocks BLK0 to BLKm−1 includes plural pages (pages P0 to Pn−1 in this case). The blocks BLK0 to BLKm−1 function as erase units. The blocks may be called erase blocks, physical blocks or physical erase blocks. Pages P0 to Pn−1 are units for a data write operation and a data read operation.

The controller 4 is electrically connected to the NAND flash memory 5 which is a nonvolatile memory via a NAND interface 13 such as Toggle NAND flash interface or Open NAND Flash Interface (ONFI). The controller 4 operates as a memory controller configured to control the NAND flash memory 5. The controller 4 may be realized by a circuit such as a System-on-a-chip (SoC).

As illustrated in FIG. 4, the NAND flash memory 5 may include plural NAND flash memory chips (NAND flash memory dies). Each of the NAND flash memory chips can operate independently. For this reason, the NAND flash memory chips function as parallel operation units. FIG. 4 illustrates an example of a case where sixteen channels Ch. 1 to Ch. 16 are connected to the NAND interface 13, and two NAND flash memory chips are connected to each of sixteen channels Ch. 1 to Ch. 16. In this case, sixteen NAND flash memory chips #1 to #16 connected to channels Ch. 1 to Ch. 16 may be organized as bank #0, and remaining sixteen NAND flash memory chips #17 to #32 connected to channels Ch. 1 to Ch. 16 may be organized as bank #1. The banks function as parallel operation units for operating plural memory modules in parallel by bank interleaving. In the configuration example of FIG. 4, a maximum of thirty-two NAND flash memory chips can be urged to execute the parallel operation by sixteen channels and bank interleaving using two banks.

An erase operation may be executed in units of single block (physical block) or units of block group (super block) including a set of plural physical blocks capable of parallel operation. Each block group (one super block) is not limited to this but may include thirty-two physical blocks selected from respective NAND flash memory chips #1 to #32. Each of NAND flash memory chips #1 to #32 may comprise a multiplane structure. For example, when each of NAND flash memory chips #1 to #32 comprises a multiplane structure including two planes, each super block may include sixty-four physical blocks in total selected one by one from sixty-four planes corresponding to NAND flash memory chips #1 to #32.

FIG. 5 illustrates an example of a super block (SB) including thirty-two physical blocks (i.e., physical block BLK2 in NAND flash memory chip #1, physical block BLK3 in NAND flash memory chip #2, physical block BLK7 in NAND flash memory chip #3, physical block BLK4 in NAND flash memory chip #4, physical block ELKS in NAND flash memory chip #5, . . . , physical block BLK3 in NAND flash memory chip #32).

The write destination block may be either a single physical block or a single super block. Each super block may include only one physical block and, in this case, a single super block is equivalent to a single physical block.

Next, the configuration of the controller 4 of FIG. 3 will be described.

The controller 4 includes a host interface 11, CPU 12, a NAND interface 13, a DRAM interface 14, a direct memory access controller (DMAC) 15, an ECC encode/decode unit 16, and the like. The host interface 11, the CPU 12, the NAND interface 13, the DRAM interface 14, the DMAC 15, and the ECC encode/decode unit 16 are interconnected via the bus 10.

The host interface 11 is a host interface circuit configured to execute communication with the host 2. The host interface 11 may be, for example, a PCIe controller (NVMe controller). Alternatively, when the flash storage device 3 is connected to the host 2 via Ethernet (registered trademark), the host interface 11 may be an NVMe over Fabrics (NVMeOF) controller.

The host interface 11 receives various commands from the host 2. The commands include a write command, a read command, an erase command, a reuse command, a QoS domain create command, and other various commands.

The CPU 12 is a processor configured to control the host interface 11, the NAND interface 13, the DRAM interface 14, the DMAC 15, and the ECC encode/decode unit 16. The CPU 12 loads a control program (firmware) from the NAND flash memory 5 or a ROM (not illustrated) to the DRAM 6 in response to power-on of the flash storage device 3 and executes various processing by executing the firmware. The firmware may be loaded into a SRAM in the controller 4, which is not illustrated in the drawings. The CPU 12 can execute command processing for executing various commands from the host 2, and the like. The operations of the CPU 12 are controlled by the above-described firmware which is executed by the CPU 12. Several or all parts of the command processing may be executed by dedicated hardware in the controller 4.

The CPU 12 can function as a write control unit 21, a read control unit 22, a copy control unit 23, and a block management unit 24. Several or all parts of each of the write control unit 21, the read control unit 22, the copy control unit 23, and the block management unit 24 may also be implemented by dedicated hardware in the controller 4.

The write control unit 21 receives a write command designating the QoS domain ID and the tag from the host 2. The tag is an identifier capable of identifying data (user data) to be written and may be, for example, LBA, a key of a key-value store, or a hash value of this key. When the write control unit 21 receives the write command, the write control unit 21 selects one of blocks of the common block group 602, and allocates the selected block as a write destination block for the QoS domain corresponding to the QoS domain ID designated by the write command. The block allocated as the write destination block for the QoS domain may be a physical block or a super block.

In this case, the write control unit 21 may select a block (a physical block or a super block) having the minimum program/erase cycle count. Wear leveling can be thereby executed between the QoS domains. If a usable write destination block is already allocated for this QoS domain, the operation of allocating one of the blocks of the common block group 602 as the write destination block for the QoS domain is not executed.

The write control unit 21 determines a location in the write destination block (i.e., a write destination location) to which the data is to be written, by considering restrictions on page write order, defective pages in the write destination block, and the like. Next, the write control unit 21 writes the data (write data) from the host 2 to the write destination location of the write destination block. In this case, the write control unit 21 can write not only the data from the host 2, but also both of the data and the tag of the data to the write destination block.

When a whole write destination block of a certain QoS domain is filled with the data, the write control unit 21 allocates one of the blocks of the common block group 602 as a new write destination block for this QoS domain. For example, if an entire portion of a current write destination block is filled with data by write of a part of the write data associated with a certain write command, the write control unit 21 allocates one of the blocks of the common block group 602 as a new write destination block for this QoS domain and writes the remaining part of the write data associated with the write command to the new write destination block.

When the write data is written to the write destination block, the write control unit 21 sends to the host 2 the physical address (block address and offset) indicative of the storage location in the nonvolatile memory to which the data is written as an address record request.

In a case of allocating one physical block as a write destination block, the block address is a block address for identifying the physical block. This block address may be indicated by a chip number and a block number in the chip.

In a case of allocating one super block as a write destination block, the block address is a block address (also called a super block address) for identifying the super block. Different super block addresses may be given to all the super blocks in the flash storage device 3.

The offset is indicative of an offset from the beginning of the write destination block to the write destination location, i.e., an offset of the write destination location with respect to the beginning of the write destination block. The size of the offset from the beginning of the write destination block to the write destination location may be represented by a multiple of the grain having a certain size. Alternatively, the offset may be represented by the page address of a page and an offset in the page.

When the read control unit 22 receives the read command to designate the physical address (i.e., the block address and the offset) from the host 2, the read control unit 22 reads the data from the NAND flash memory 5, based on the block address and the offset. The read target block is specified by the block address. The read target storage location in the block is specified by the offset. The read command may further include QoS domain ID of the read target QoS domain.

In response to the copy command received from the host 2, the copy control unit 23 copies data in a certain block allocated for a certain QoS domain to a block (copy destination block) for this QoS domain or the other QoS domain. The copy destination block is a write destination block to which the data already written in the nonvolatile memory is to be written (copied). This copy command may designate a QoS domain ID of the copy source QoS domain, a block address of the copy source block, and a QoS domain ID of the copy destination QoS domain. The copy source block may be a physical block or a super block.

In addition, the host 2 can transmit management data (map data) indicative of whether the data in the copy source block is valid data or invalid data, in units of a predetermined management size (for example, 4 KB), to the flash storage device 3. This map data may be included in the copy command or may be transmitted from the host 2 to the flash storage device 3 apart from the copy command 3. In response to the map data and the copy command received from the host 2, the copy control unit 23 can copy valid data in the copy source block to a block (copy destination block) for this QoS domain or the other QoS domain.

When copying the data (valid data) from the copy source block to the copy destination block is completed, the copy control unit 23 notifies the host 2 of a tag of the data and a copy destination physical address (block address and offset) of the data for each element of the copied data.

The block management unit 24 returns the block designated by the reuse command received from the host 2 to the common block group 602 and thereby transitions this block to a reusable state of being reusable as a new write destination block for any QoS domain. The block designated by the reuse command may be a physical block or a super block.

In addition, the block management unit 24 executes an erase operation of the block designated by the erase command received from the host 2, returns this block to the common block group 602 and thereby transitions this block to a reusable state of being reusable as a new write destination block for any QoS domain. The block designated by the erase command may also be a physical block or a super block.

The NAND interface 13 is a memory control circuit configured to control the NAND flash memory 5 under the control of the CPU 12.

The DRAM interface 14 is a DRAM control circuit configured to control the DRAM 6 under the control of the CPU 12. A storage region in the DRAM 6 is utilized to store the command queue 31 and the block management table 32. In addition, the storage region of the DRAM 6 can also be used as an internal buffer for temporarily storing the write data and the like. A buffer-less configuration that an internal buffer is not provided in the flash storage device 3 or the capacity of the internal buffer is close to approximately zero may be applied to the flash storage device 3.

For example, the command queue 31 may be used to store each command in the waiting state. The command queue 31 may be a common command queue shared by QoS domains #0 to #n−1 or divided into plural command queues #0 to #n−1 corresponding to the QoS domains #0 to #n−1. In a case where the plural command queues #0 to #n−1 are prepared, a command in a waiting state designating QoS domain ID #0 of QoS domain #0 is input to command queue #0, a command in a waiting state designating QoS domain ID #1 of QoS domain #1 is input to command queue #1 and, similarly, a command in a waiting state designating QoS domain ID #n−1 of QoS domain #n−1 is input to command queue #n−1.

The block management table 32 includes plural management tables corresponding to plural blocks in the NAND flash memory 5, respectively. Each of the management tables is used to store management information (metadata) for managing a block corresponding to the management table. The metadata is not limited to this, but may include a rewrite count (the number of program/erase cycles), an opened/closed state, a write destination page range, and the like. The opened/closed state is indicative of an opened state or closed state of this block. The opened state is indicative of a state where this block is being used as a write destination block. The write destination block implies a write destination block for host write to which the data is written from the host 2 and a write destination block to which the data already written in the nonvolatile memory is copied. The write destination block for data copy is also called a copy destination block.

The closed state is indicative of a state where the block is filled with the data and managed as an active block. The write destination page range is indicative of a range of pages on which the write (program) operation is currently executed.

DMAC 15 executes data transfer between the memory (write buffer) in the host 2 and DRAM 6 (internal buffer) under control of the CPU 12. When the write data needs to be transferred from the write buffer of the host 2 to the internal buffer, the CPU 12 designates a transfer source address indicative of a location on the write buffer, data size, and a transfer destination address indicative of a location on the internal buffer to the DMAC 15.

When the data is to be written to the NAND flash memory 5, the ECC encode/decode unit 16 encodes (ECC-encodes) the write data to be written and thereby adds an error-correcting code (ECC) to the data. When the data is read from the NAND flash memory 5, the ECC encode/decode unit 16 executes error correction of this data by using ECC added to the read data.

FIG. 6 illustrates a write command applied to the flash storage device 3.

The write command is a command to request the flash storage device 3 to write the data. The write command may include command ID, QoS domain ID, the tag, the length, the write buffer address, and the like.

The command ID is an identifier unique to this command (i.e., this write command). The QoS domain ID is an identifier capable of uniquely identifying the QoS domain to which the data is to be written. A write command transmitted from the host 2 in response to a write request from an application corresponding to a certain end user includes the QoS domain ID designating the QoS domain corresponding to this end user.

The tag is an identifier for identifying write data to be written. The tag may be a logical address such as LBA, a key of a key-value store or a hash value of this key, as described above.

The length is indicative of the length of the write data to be written. The length (data length) may be designated by the number of the above-described granularity (also referred to as Grain), designated by the number of LBA, or designated by bytes.

The write buffer address is indicative of a location in the host memory (write buffer of the host 2) where the write data to be written is stored. The write buffer address is also referred to as a data pointer.

The controller 4 can create the QoS domain having a capacity designated by the QoS domain create command, based on the QoS domain create command received from the host 2. In this case, the controller 4 may secure (reserve) the number of blocks corresponding to the designated capacity, of the common block group 602 illustrated in FIG. 2, for this QoS domain. Every time the host 2 transmits the QoS domain create command, a new QoS domain is created.

The controller 4 can manage not only the common block group 602, but also the active block list (active block pool) corresponding to each of the QoS domains.

The state of each block is roughly classified into an active block (block in a closed state) where valid data is stored, and a free block where valid data is not stored and which can be reused as a write destination block. At a certain QoS domain, each of the blocks which are the active blocks is managed by an active block list corresponding to this QoS domain. In contrast, each of the free blocks of each QoS domain is managed by the common block group 602.

When the controller 4 receives a write command to designate a certain QoS domain ID from the host 2, the controller 4 selects one of blocks (free blocks) in the common block group 602 and allocates the selected block to this QoS domain as a write destination block. Furthermore, the controller 4 determines the location (write destination location) in the write destination block. The write destination location in the write destination block is determined in consideration of the restrictions on page write order, the bad pages, and the like. Then, the controller 4 writes the data from the host 2 to the write destination location in the write destination block.

If the whole write destination block is filled with the user data, the controller 4 moves the write destination block to the active block list (active block pool) of this QoS domain. The controller 4 selects again one of blocks (free blocks) in the common block group 602 and allocates the selected block to this QoS domain as a new write destination block.

An upper limit of the number of blocks that can be allocated to a certain QoS domain is limited to the number of blocks corresponding to the capacity of this QoS domain. If one of the blocks of the common block group 602 is allocated to this QoS domain, the controller 4 decrements the current number of blocks that can be allocated to this QoS domain by 1. If one of the blocks of this QoS domain is returned to the common block group 602 by the reuse command or the erase command designating the one of the blocks of this QoS domain, the controller 4 increments the current number of blocks that can be allocated to this QoS domain by 1.

FIG. 7 illustrates an address record request transmitted from the flash storage device 3 to the host 2.

The address record request is used to notify the host 2 of the physical address indicative of the storage location (physical storage location) in the NAND flash memory 5 where the write data associated with the write command is written. The address record request may include QoS domain ID, the tag, the physical address, and the length.

The QoS domain ID is an identifier for identifying the QoS domain to which the write data is written. The tag is the tag included in the write command illustrated in FIG. 6. The physical address is indicative of a physical storage location where the write data associated with the write command is written. The physical address is represented by the block address and the offset. The length is indicative of the length of the written write data.

On the basis of the address record request received from the flash storage device 3, the host 2 can update LUT corresponding to this QoS domain such that the physical address (block address and offset) indicative of the storage location where the write data is written is associated with a tag (for example, LBA) of the write data. In addition, the host 2 can manage validity/invalidity management information for each block used in the QoS domain, based on the content of LUT corresponding to each QoS domain. The validity/invalidity management information corresponding to a certain block indicates whether each of the data stored in this block is valid data or invalid data.

FIG. 8 illustrates a read command applied to the flash storage device 3.

The read command is a command to request the flash storage device 3 to read the data. The read command may include the command ID, the QoS domain ID, the physical address, the length, and the read buffer address.

The command ID is an identifier unique to this command (i.e., this read command). The QoS domain ID is an identifier for identifying the QoS domain to which the data to be read is stored. The physical address is indicative of a physical storage location to which the data to be read is stored. The physical address is represented by the block address and the offset. This block address is a block address of the read target block. The offset is indicative of a read target storage location in the read target block. The length is indicative of the length of the data to be read. The read buffer address is indicative of a location in the host memory (read buffer of the host 2) to which the read data is to be transferred.

FIG. 9 illustrates a reuse command.

The reuse command is a command for returning the block to which the data is already written to the common block group 602 and setting this block to be a reusable state (free block) of being reusable as a new write destination block for any QoS domain.

This reuse command may include the command ID, the QoS domain ID, and the physical address.

The command ID is an identifier unique to this command (i.e., this reuse command). The QoS domain ID is an identifier for identifying the QoS domain to which the block to be in a reusable state currently belongs. The physical address is a block address of the block which is to be in a reusable state.

When all data in a block of a certain QoS domain are invalidated by the updated data write operation or data copy operation, the host 2 transmits the reuse command or erase command designating this block to the flash storage device 3. The erase command may also include the command ID, the QoS domain TD, and the physical address (block address), similarly to the reuse command.

FIG. 10 illustrates a QoS domain create command.

The QoS domain create command is a command for creating a QoS domain. The QoS domain create command may include a command ID, a QoS domain ID, and a capacity.

The command ID is an identifier unique to this command (i.e., this QoS domain create command). The QoS domain ID is an identifier of a QoS domain to be created. The capacity is indicative of a capacity which is to be secured for the QoS domain to be created. The controller 4 secures the number of blocks corresponding to this capacity from the common block group 602, and allocates one of the secured blocks as the write destination block for this QoS domain in response to receiving the write command designating this QoS domain ID.

FIG. 11 illustrates the block address and offset which define the physical address.

The block address designates a certain block BLK. Each of the blocks BLK includes plural pages (page 0 to page n in this case) as illustrated in FIG. 11.

In a case where the page size (user data storing area of each page) is 16K bytes and the grain is the size of 4 KB, this block BLK is logically divided into 4×(n+1) regions.

Offset +0 is indicative of a first 4 KB region of page 0, offset +1 is indicative of a second 4 KB region of page 0, offset +2 is indicative of a third 4 KB region of page 0, and offset +3 is indicative of a fourth 4 KB region of page 0.

Offset +4 is indicative of a first 4 KB region of page 1, offset +5 is indicative of a second 4 KB region of page 1, offset +6 is indicative of a third 4 KB region of page 1, and offset +7 is indicative of a fourth 4 KB region of page 1.

FIG. 12 illustrates a relationship between the block address and the offset in a case of using a super block.

To simplify the illustration, one superblock SB #1 is assumed to be composed of four blocks BLK #11, BLK #21, BLK #31, and BLK #41. A block address (super block address) of super block SB #1 is SB #1. Four blocks BLK #11, BLK #21, BLK #31, and BLK #41 may be blocks selected from four different NAND flash memory chips (NAND flash memory dies), respectively.

The data are written in order of page 0 of block BLK #11, page 0 of block BLK #21, page 0 of block BLK #31, page 0 of block BLK #41, page 1 of block BLK #11, page 1 of block BLK #21, page 1 of block BLK #31, page 1 of block BLK #41, . . . by the controller 4.

Offset +0 is indicative of a first 4 KB area of page 0 of block BLK #11, offset +1 is indicative of a second 4 KB area of page 0 of block BLK #11, offset +2 is indicative of a third 4 KB area of page 0 of block BLK #11, and offset +3 is indicative of a fourth 4 KB area of page 0 of block BLK #11.

Offset +4 is indicative of a first 4 KB area of page 0 of block BLK #21, offset +5 is indicative of a second 4 KB area of page 0 of block BLK #21, offset +6 is indicative of a third 4 KB area of page 0 of block BLK #21, and offset +7 is indicative of a fourth 4 KB area of page 0 of block BLK #21.

Similarly, offset +12 is indicative of a first 4 KB area of page 0 of block BLK #41, offset +13 is indicative of a second 4 KB area of page 0 of block BLK #41, offset +14 is indicative of a third 4 KB area of page 0 of block BLK #41, and offset +15 is indicative of a fourth 4 KB area of page 0 of block BLK #41.

Offset +16 is indicative of a first 4 KB area of page 1 of block BLK #11, offset +17 is indicative of a second 4 KB area of page 1 of block BLK #11, offset +18 is indicative of a third 4 KB area of page 1 of block BLK #11, and offset +19 is indicative of a fourth 4 KB area of page 1 of block BLK #11.

Offset +20 is indicative of a first 4 KB area of page 1 of block BLK #21, offset +21 is indicative of a second 4 KB area of page 1 of block BLK #21, offset +22 is indicative of a third 4 KB area of page 1 of block BLK #21, and offset +23 is indicative of a fourth 4 KB area of page 1 of block BLK #21.

Similarly, offset +28 is indicative of a first 4 KB area of page 1 of block BLK #41, offset +29 is indicative of a second 4 KB area of page 1 of block BLK #41, offset +30 is indicative of a third 4 KB area of page 1 of block BLK #41, and offset +31 is indicative of a fourth 4 KB area of page 1 of block BLK #41.

For example, if 4K-byte data corresponding to a write command designating certain LBA (LBAx) is written to the location corresponding to offset +8, the controller 4 may return the tag (=LBAx), the block number (=SB #1), the offset (=+8), and the length (=1) to the host 2 as the address record request with respect to the write command.

FIG. 13 illustrates plural QoS domains managed by the flash storage device 3.

FIG. 13 explicitly illustrates a case where QoS domain #0, QoS domain #1, QoS domain #2, . . . , QoS domain #n−1 are already created. In FIG. 13, these QoS domains are represented by squares. A vertical width of a square representing a certain QoS domain is indicative of the capacity of this QoS domain.

User application #0 can make a read/write access to the QoS domain #0 with the read/write command including the QoS domain ID #0 of the QoS domain #0. Similarly, user application #n−1 can make a read/write access to the QoS domain #n−1 with the read/write command including the QoS domain ID #n−1 of the QoS domain #n−1.

FIG. 14 illustrates data write processing executed by the host 2 and the flash storage device 3.

(1) At the host 2, host FTL 701 is executed. The host FTL 701 manages mapping between each of the tags such as LBAs and each of the physical addresses of the flash storage device 3, with LUT. In response to a write request from a certain user application, the host FTL 701 transmits a write command to designate QoS domain ID of a QoS domain corresponding to this user application, to the flash storage device 3. The host FTL 701 needs only to designate the QoS domain ID alone and does not need to designate a block to which the data is to be written or a page to which the data is to be written. For this reason, the host FTL 701 does not need to manage defective blocks, defective pages, and the like in the flash storage device 3.

(2) The controller 4 of the flash storage device 3 selects one of the blocks of the common block group (free block group) 602 shaped by plural QoS domains 601. The controller 4 allocates the selected block as a write destination block for the QoS domain having the QoS domain ID designated by the received write command. In the common block group (free block group) 602, the only free block group other than the defective blocks may be managed. For example, a block having the least number of program/erase cycles may be selected from the common block group 602. The controller 4 determines this write destination block as the block to which the data is to be written and further determines a write destination location in the write destination block to which the data is to be written. As described above, if the write destination block for this QoS domain is already allocated, the controller 4 needs only to determine the already allocated write destination block as the block to which the data is to be written, and does not need to execute the operation of allocating one of the blocks of the common block group 602 as the write destination block for this QoS domain.

(3) The controller 4 transmits to the host 2 a physical address record request including both the block address indicative of the determined write destination block and the offset indicative of the determined write destination location, and thereby notifies the host 2 of the physical address to which the write data associated with this write command is written.

(4) The controller 4 retrieves write data from the write buffer 702 of the host 2, based on the write buffer address included in the write command. The retrieval of the write data from the write buffer 702 may be executed by DMA transfer. Then, the controller 4 executes a data write operation of writing the write data to the write destination location in the write destination block.

(5) After writing the write data is completed such that the write data becomes readable from the NAND flash memory 5, the controller 4 sends to the host 2 a release request to release the region in the write buffer 702 where the write data is stored. This release request may include an identifier of the write command corresponding to the write data having its writing completed. Alternatively, this release request may include a write buffer address indicative of the storage location of the write data and a length of the write data. The host 2 releases the region in the write buffer 702 where the write data is stored, in response to the release request. The released region in the write buffer 702 is usable for storing the other write data, and the like.

FIG. 15 illustrates data read processing executed by the host 2 and the flash storage device 3.

(1) When the host FTL 701 receives the read request from a certain user application, the host FTL 701 retrieves the physical address corresponding to the tag such as LBA designated by the read request by referring to LUT in the host FTL 701. The host FTL 701 transmits to the flash storage device 3 the read command to designate the QoS domain ID of the QoS domain corresponding to this user application, the retrieved physical address (block address and offset), the length, and the read buffer address.

(2) When the controller 4 receives this read command, the controller 4 reads the data from the NAND flash memory 5, based on the block address and offset designated by this read command. Then, the controller 4 transfers the read data to a location in the read buffer 703 of the host 2, which is designated by the read buffer address, by using DMA transfer.

Figure 16:
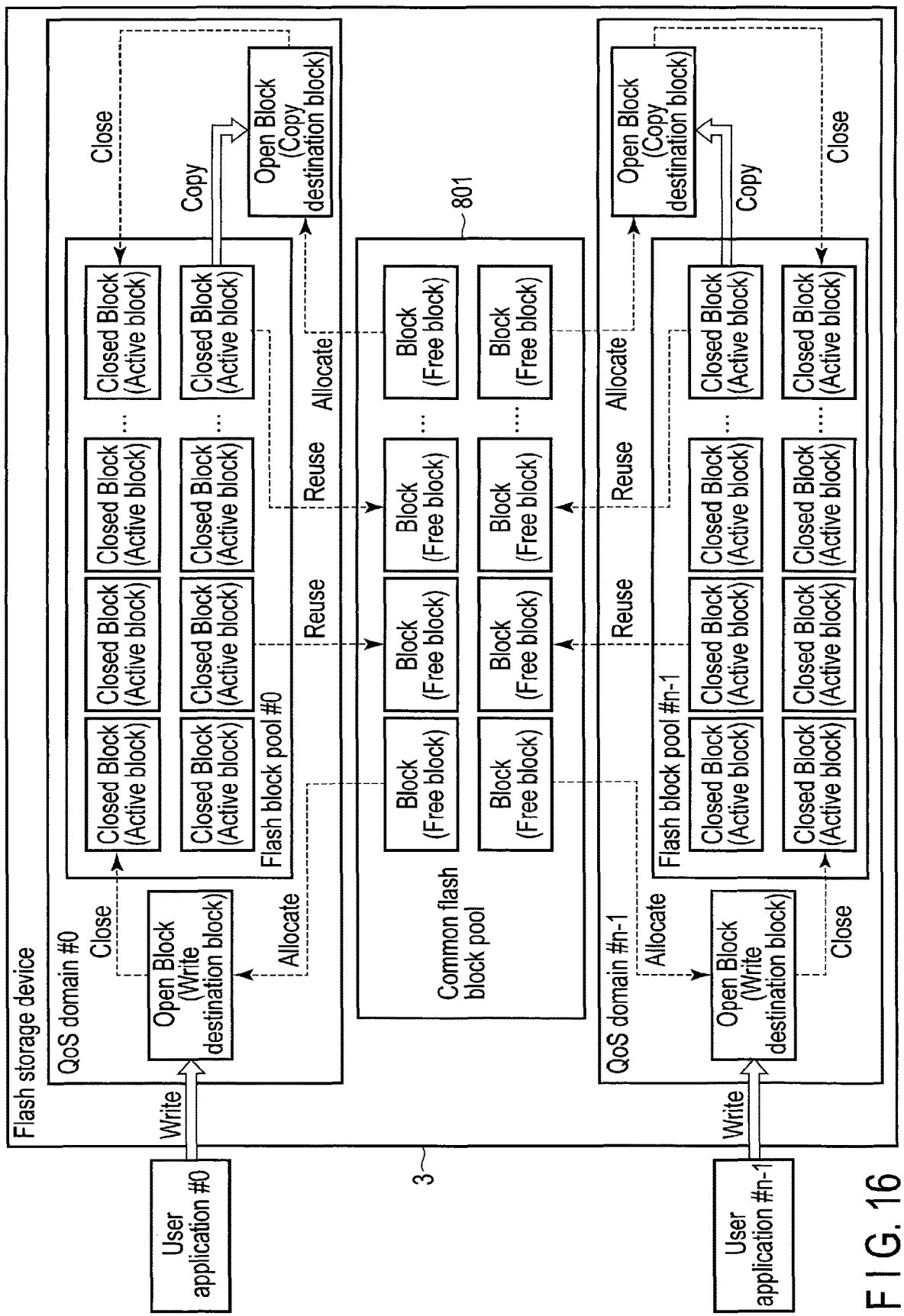
FIG. 16 is a block diagram illustrating a relationship between QoS domains and a common flash block pool which are managed by the memory system of the embodiment.

FIG. 16 illustrates a relationship between plural QoS domains and the common flash block pool, which is managed by the controller 4 of the flash storage device 3.

In FIG. 16, two QoS domains alone, i.e., QoS domain #0 and QoS domain #n−1, are illustrated to simplify the illustration. A common flash block pool 801 is a list to manage the above-described common block group 602 shared by the QoS domains.

Flash block pool #0 of the QoS domain #0 is the above-described active block list for management of each of the active blocks belonging to the QoS domain #0.

When the controller 4 receives the write command to designate QoS domain ID #0 of the QoS domain #0, the controller 4 determines whether the write destination block (opened block) for QoS domain #0 is already allocated or not.

If the write destination block (opened block) is not already allocated, the controller 4 allocates a free block in the common flash block pool 801 as the write destination block (opened block) for QoS domain #0. Then, the controller 4 determines the write destination location in this write destination block, and writes the write data associated with the write command to this write destination location in this write destination block.

In contrast, if the write destination block (opened block) is already allocated, the controller 4 determines the write destination location in this write destination block, and writes the write data associated with the write command to this write destination location in this write destination block.

When the whole write destination block is filled with the data from the host, the controller 4 manages this write destination block by the flash block pool #0 (i.e., this write destination block is closed), and allocates a free block in the common flash block pool 801 as a new write destination block (opened block) for QoS domain #0.

When the controller 4 receives the copy command designating the copy source QoS domain indicative of the QoS domain ID #0, the block address of the copy source block, and the copy destination QoS domain indicative of the QoS domain ID #0, the controller 4 determines whether the copy destination block (opened block) for QoS domain #0 is already allocated or not.

If the copy destination block (opened block) is not already allocated, the controller 4 allocates a free block in the common flash block pool 801 as the copy destination block (opened block) for QoS domain #0. Then, the controller 4 selects the block in the flash block pool #0 as the copy source block, based on the block address of the copy source block, and copies the data in the selected copy source block to the copy destination block. In a case where the map data has been received from the host 2, the controller 4 copies each valid data in the selected copy source block to the copy destination block, based on the map data.

In contrast, if the copy destination block is already allocated, the controller 4 copies the data in the selected copy source block to the copy destination block.

When the whole copy destination block is filled with the data, the controller 4 manages the copy destination block by the flash block pool #0 (i.e., the copy destination block is closed), and allocates a free block in the common flash block pool 801 as a new copy destination block (opened block) for QoS domain #0.

When the whole data in one of the blocks belonging to the QoS domain #0 become invalid data by the updated data write operation or the data copy operation, the host 2 transmits a reuse command to designate the block address of this block to the flash storage device 3.

When the controller 4 receives the reuse command from the host 2, the controller 4 returns the block in the flash block pool #0 designated by the reuse command to the common flash block pool 801 and sets this block to be in a reusable state of being reusable as a new write destination block (or copy destination block) for an optional QoS domain.

When the whole data in one of the blocks belonging to the QoS domain #0 become invalid data by the updated data write operation or the data copy operation, the host 2 may transmit an erase command to designate the block address of this block to the flash storage device 3. When the controller 4 receives the erase command from the host 2, the controller 4 executes the erase operation for the block in the flash block pool 40 designated by the erase command, returns this block to the common flash block pool 801, and sets this block to be in a reusable state of being reusable as a new write destination block (or copy destination block) for any QoS domain.

In QoS domain #n−1, too, the controller 4 executes allocation of the write destination block/copy destination block, processing of managing the write destination block/copy destination block filled with the data by the flash block pool #n−1, processing of returning the block designated by the reuse command/erase command to the common flash block pool 801, and the like.

Thus, the host 2 transmits each read command, each write command, and each reuse command/erase command, to the flash storage device 3. In addition, in general, each command transmitted from the host 2 to the flash storage device 3 includes priority, and priority of the reuse command/erase command is often higher than priority of the command for data access such as the read command/write command.

For this reason, although the read command to read data from a certain block is not completed, the reuse command/erase command designating this block may be transmitted from the host 2 to the flash storage device 3.

In this case, when the read command is to be actually executed, the read command cannot be executed normally since this block is already returned to the common flash block pool 801 as the free block. An indefinite value may be returned to the host as the read data according to circumstances.

For example, several read commands to require reading the data in the copy source block may be issued while the operation of copying the data from the copy source block to the copy destination block is executed. Then, when all data of the copy source block become invalid data, the host 2 may issue the reuse command/erase command designating this copy source block. In this case, if the read command designating the copy source block, which is already issued by the host 2, is incomplete, collision between the read command and the reuse command (or erase command) occurs.

If the host FTL 701 executes processing of controlling issue of a new command while checking completion of all of already issued commands, such collision between the read command and the reuse command (or erase command) may be able to be avoided. However, if such check processing is executed, a wait time for the check processing may be required every time the host FTL 701 is to issue the command, and the I/O performance may be degraded.

Thus, in the embodiment, when the controller 4 receives the reuse command/erase command designating a certain block from the host 2, the controller 4 executes processing of determining whether an incomplete read command already received from the host 2 and designating a block address of this block exists or not.

As illustrated in FIG. 17, when the reuse command/erase command designating a block address of block BLK #1 of QoS domain #0 is received from the host 2, the controller 4 determines whether an incomplete read command already received from the host 2 and designating the block address of the block ELK #1 exists or not.

In a case where an incomplete read command designating the block address of the block BLK #1 exists, the controller 4 waits until execution of the incomplete read command designating the block address of the block BLK #1 is completed. After execution of the incomplete read command, the controller executes the reuse command/erase command designating the block address of block BLK #1, and thereby transitions the block BLK #1 to the reusable state (free block).

In contrast, if an incomplete read command designating the block address of the block BLK #1 exists, the controller 4 can immediately execute the reuse command/erase command designating the block address of block BLK #1.

FIG. 18 illustrates the block management table 32 including a command number counter, which is managed by the controller 4.

For example, in the block management table 32 corresponding to the block BLK #1, a command number counter (hereinafter called an in-flight command number counter) is added as metadata for managing the state of the block BLK #1.

The value of the in-flight command number counter is used as a counter value indicative of the number of the read commands which are already received from the host 2 and which are incomplete. The controller 4 manages the in-flight command number counter of each of blocks other than the free blocks (block group in a reusable state) included in the common flash block pool 801.

Every time the controller 4 receives the read command from the host 2, the controller 4 increments the in-flight command number counter value corresponding to the block designated by the block address in the received read command by 1.

Every time the execution of the received read command is completed, i.e., every time the data read operation corresponding to the read command is completed, the controller 4 decrements the in-flight command number counter value corresponding to the block designated by the block address in the completed read command by 1.

When the controller 4 receives, from the host 2, a command (reuse command or erase command) to transition a certain block to a reusable state, the controller 4 determines whether an incomplete read command already received from the host 2 and designating the block address of this block exists or not, in accordance with whether the in-flight command number counter value corresponding to this block is zero or not.

For example, as regards the block BLK #1, when the controller 4 allocates a block BLK #1 as the write destination block for QoS domain #0, the controller 4 sets the in-flight command number counter value corresponding to the block BLK #1 to zero.

When the read command designating the block address of the block BLK #1 arrives, the controller 4 increments the in-flight command number counter value corresponding to the block BLK #1 by 1.

When execution of the read command designating the block address of the block BLK #1 is completed, the controller 4 decrements the in-flight command number counter value corresponding to the block BLK #1 by 1.

The copy command is also a command which needs to read the data from the copy source block and, therefore, if the reuse command (or erase command) to designate this copy source block is received from the host 2 in a state where an incomplete copy command exists, collision between the copy command and the reuse command (or erase command) occurs. For this reason, when the controller 4, from the host 2, receives a command (reuse command or erase command) to transition a certain block to a reusable state, the controller 4 may determine not only whether an incomplete read command already received from the host 2 and designating the block address of this block exists or not, but whether an incomplete copy command already received from the host 2 and designating the block address of this block as the block address of the copy source block exists or not.

After completing execution of both of the incomplete read command which designates the block address of this block and the incomplete copy command which designates the block address of this block as the block address of the copy source block, the controller 4 executes the command (reuse command or erase command) to transition this block to a reusable state and thereby transitions this block to the reusable state.

The number of incomplete copy commands can also be managed by the in-flight command number counter.

For example, as regards the block BLK #1, when the controller 4 allocates the block BLK #1 as the write destination block for QoS domain #0, the controller 4 sets the in-flight command number counter value corresponding to the block BLK #1 to zero.

When the read command designating the block address of the block BLK #1 arrives, the controller 4 increments the in-flight command number counter value corresponding to the block BLK #1 by 1.

When execution of the read command designating the block address of the block BLK #1 is completed, the controller 4 decrements the in-flight command number counter value corresponding to the block BLK #1 by 1.

When the copy command to designate the block address of the block BLK #1 as the block address of the copy source block arrives, the controller 4 increments the in-flight command number counter value corresponding to the block BLK #1 by 1.

When execution of the copy command to designate the block address of the block BLK #1 as the block address of the copy source block is completed, the controller 4 decrements the in-flight command number counter value corresponding to the block BLK #1 by 1.

The flowchart of FIG. 19 illustrates a procedure of in-flight command number counter update processing executed by the controller 4.

The controller 4 determines whether the command received from the host 2 is the read command or not (step S11).

If the received command is the read command (YES in step S11), the controller 4 increments the in-flight command number counter value corresponding to the read target block designated by the block address in the read command by 1 (step S12). If execution of the read command is completed (YES in step S13), the controller 4 decrements the in-flight command number counter value corresponding to the read target block designated by the block address in the read command by 1 (step S14).

The flowchart of FIG. 20 illustrates another procedure of the in-flight command number counter update processing executed by the controller 4.

In the in-flight command number counter update processing of FIG. 20, processing in steps S21 to S24 is added in addition to the processing in steps S11 to S14 in FIG. 19.

If the command received from the host 2 is not the read command (NO in step S11), the controller 4 determines whether this command is a copy command or not (step S21).

If this command is the copy command (YES in step S21), the controller 4 increments the in-flight command number counter value corresponding to the copy source block designated by the copy source block address in the copy command by 1 (step S22). If execution of this copy command is completed (YES in step S23), the controller 4 decrements the in-flight command number counter value corresponding to the copy source block designated by the copy source block address in the copy command by 1 (step S24).

FIG. 21 illustrates a command queue check operation executed by the controller 4. The command queue check operation is an operation to determine whether an incomplete read command designating a block address of the same block as the block designated by the reuse command exists or not.

Instead of using the above-described in-flight command number counter, the controller 4 may determine whether an incomplete read command already received from the host 2 and designating the block address designated by the reuse command exists or not, by referring to the command queue 31 in the controller 4 where each of incomplete commands is stored. In a case where the command queue 31 is divided into plural command queues corresponding to plural QoS domains, the controller 4 may refer to the only command queue corresponding to the QoS domain designated by the reuse command.

In FIG. 21, QoS domain ID #0 and block address BLK #X are assumed to be designated by the reuse command. The controller 4 finds the read command designating the block address BLK #X by referring to the command queue #0 where incomplete commands (a command which is not executed, and a command which is being executed) corresponding to the QoS domain ID #0 are stored. If the read command designating the block address BLK #X exists in the command queue #0, the controller 4 waits until execution of the read command is completed, and executes the reuse command after execution of the read command is completed.

FIG. 22 illustrates another command queue check operation executed by the controller 4 in order to determine whether an incomplete read command designating a block address of the same block as the block designated by the reuse command exists or not.

In FIG. 22, QoS domain ID #0 and block address BLK #X are assumed to be designated by the reuse command. The controller 4 finds the read command designating the block address BLK #X and the copy command designating the source block address BLK #X by referring to the command queue #0 where incomplete commands (a command which is not executed, and a command which is being executed) corresponding to the QoS domain ID #0 are stored. If the read command designating the block address BLK #X or the copy command designating the source block address BLK #X exists in the command queue #0, the controller 4 waits until execution of the incomplete commands is completed, and executes the reuse command after execution of the incomplete commands is completed.

A flowchart of FIG. 23 illustrates a procedure of processing executed by the controller 4 when the controller 4 receives the reuse command from the host 2.

The controller 4 receives various commands from the host 2 (step S31) and executes each of the received commands (step S32). For example, when the controller 4 receives from the host 2 each read command designating the block address of the read target block and the offset indicative of the read target storage location in the read target block, the controller 4 executes the data read operation in accordance with each of the received read commands.

If the command received from the host 2 is the reuse command (YES in step S33), the controller 4 determines whether execution of all the received read commands designating the block address BLK #X designated by the reuse command is completed or not (step S34). In step S34, the controller 4 can determine whether the execution of all the received read commands designating the block address BLK #X is completed or not, by referring to the in-flight command number counter value corresponding to the block having the block address BLK #X or referring to the command queue.

If an incomplete read command designating the block address ELK #X exists (NO in step S34), the controller 4 waits until the execution of all the received read commands designating the block address BLK #X is completed (steps S35 and S36).

If the execution of all the incomplete read commands designating the block address BLK #X is completed (YES in step S36), the controller 4 executes the reuse command designating the block address BLK #X, and returns the block having the block address BLK #X to the common flash block pool 801 to set the block to be a reusable state of being reusable as a new write destination block for any QoS domain (step S37).

If the block having the block address BLK #X is returned to the common flash block pool 801 and then a new read command designating the block address BLK #X of this block existing in the common flash block pool 801 is received from the host 2 (YES in step S38), the controller 4 does not execute the received new read command, but returns a response indicative of failure of the received new read command (for example, an error notification indicating that this read command is an unauthorized command) to the host 2 (step S39).

A flowchart of FIG. 24 illustrates another procedure of the processing executed by the controller 4 when the controller 4 receives the reuse command from the host 2.

The controller 4 receives various commands from the host 2 (step S41) and executes each of the received commands (step S42). For example, if the controller 4 receives from the host 2 each read command designating the block address of the read target block and the offset indicative of the read target storage location in the read target block, the controller 4 executes the data read operation in accordance with each of the received read commands.

If the command received from the host 2 is the reuse command (YES in step S43), the controller 4 determines whether execution of all the received read commands designating the block address BLK #X designated by the reuse command and all the received copy commands designating the block address BLK #X as the copy source block address is completed or not (step S44). In step S44, the controller 4 can determine whether the execution of all the received read commands designating the block address BLK #X and all the received copy commands designating the block address BLK #X as the copy source block address is completed or not, by referring to the in-flight command number counter value corresponding to the block having the block address BLK #X or referring to the command queue.

If an incomplete read command designating the block address BLK #X or an incomplete copy command block address exists (NO in step S44), the controller 4 waits until the execution of ail of incomplete read commands designating the block address BLK #X and all of incomplete copy commands designating the block address BLK #X as the copy source block address is completed (steps S45 and S46).

If the execution of all the received read commands designating the block address ELK #X and all the received copy commands designating the block address BLK #X as the copy source block address is completed (YES in step S46), the controller 4 executes the reuse command designating the block address BLK #X, and returns the block having the block address BLK #X to the common flash block pool 801 to set the block to be a reusable state of being reusable as a new write destination block for any QoS domain (step S47).

If the block having the block address BLK #X is returned to the common flash block pool 801 and then a new read command designating the block address BLK #X of this block existing in the common flash block pool 801 is received from the host 2 (YES in step S48), the controller 4 does not execute the received new read command, but returns a response indicative of failure of the received new read command (for example, an error notification indicating that the read command is an unauthorized command) to the host 2 (step S49).

If a new copy command which designates the block address ELK #X of this block existing in the common flash block pool 801 as the copy source block address is received from the host 2, too, the controller 4 does not execute the received new copy command, but returns a response indicative of failure of the received new copy command (for example, an error notification indicating that the copy command is an unauthorized command) to the host 2.

A flowchart of FIG. 25 illustrates yet another procedure of the processing executed by the controller 4 when the controller 4 receives the reuse command from the host 2.

The controller 4 receives various commands from the host 2 (step S51) and executes each of the received commands (step S52). For example, if the controller 4 receives from the host 2 each read command designating the block address of the read target block and the offset indicative of the read target storage location in the read target block, the controller 4 executes the data read operation in accordance with each of the received read commands.

If the command received from the host 2 is the reuse command (YES in step S53), the controller 4 determines whether execution of all the received read commands designating the block address BLK #X designated by the reuse command is completed or not (step S54). In step S54, the controller 4 can determine whether the execution of all the received read commands designating the block address ELK #X is completed or not, by referring to the in-flight command number counter value corresponding to the block having the block address BLK #X or referring to the command queue.

If an incomplete read command designating the block address BLK #X exists (NO in step S54), the controller 4 does not execute the reuse command, but returns a response indicative of the failure of this reuse command (for example, an error notification indicating that the reuse command is an unauthorized command) to the host 2 (step S55). In response to receiving the response indicative of the failure of this reuse command, the host 2 may retransmit this reuse command to the flash storage device 3.

If the execution of all the read commands designating the block address BLK #X is completed (YES in step S54), the controller 4 executes the reuse command, and returns the block having the block address BLK #X to the common flash block pool 801 to set the block to be a reusable state of being reusable as a new write destination block for any QoS domain (step S56).

If the block having the block address BLK #X is returned to the common flash block pool 801 and then a new read command designating the block address BLK #X of this block existing in the common flash block pool 801 is received from the host 2 (YES in step S57), the controller 4 does not execute the received new read command, but returns a response indicative of failure of the received new read command (for example, an error notification indicating that the read command is an unauthorized command) to the host 2 (step S58).

Figure 26:
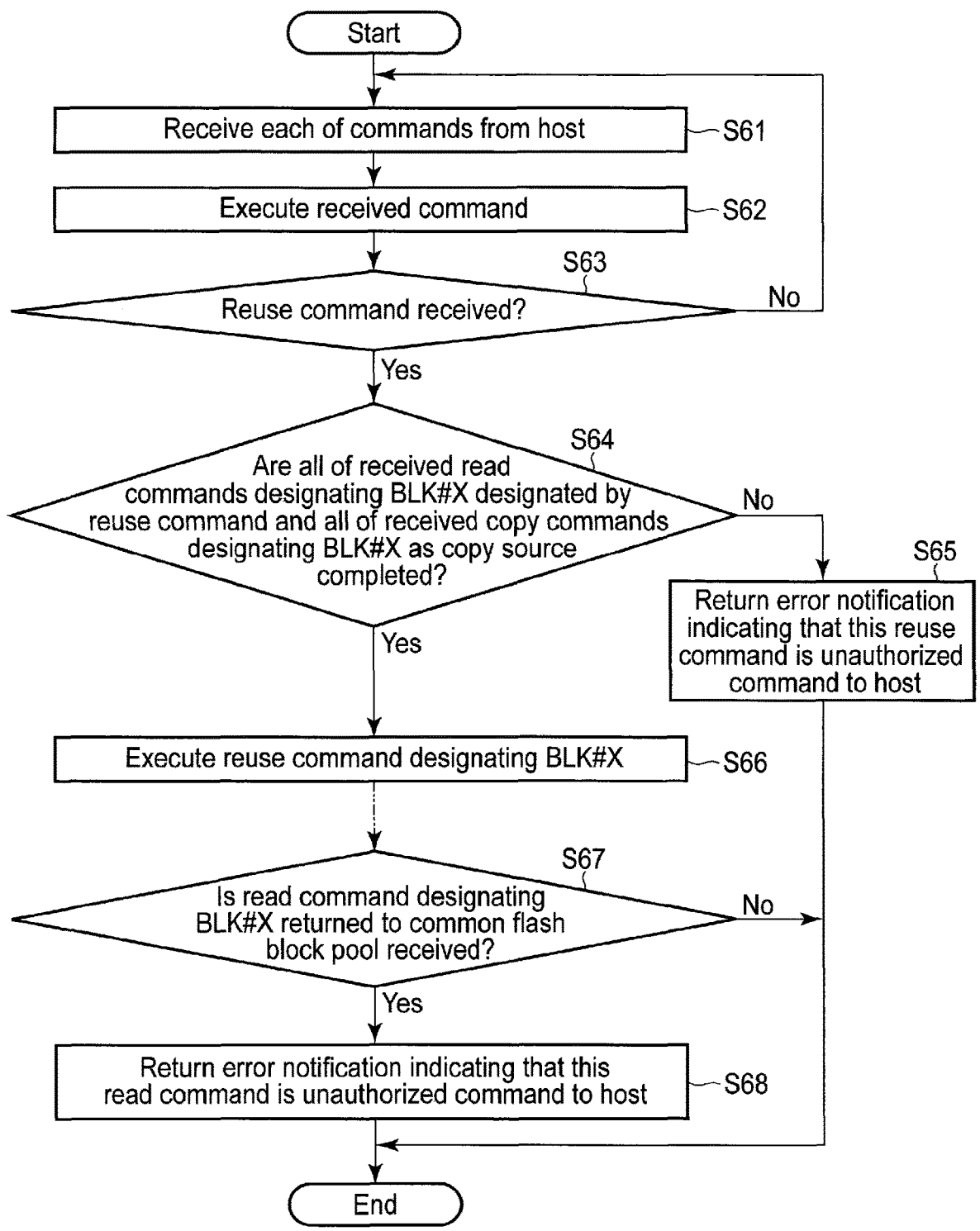
FIG. 26 is a flowchart illustrating yet another procedure of processing executed by the memory system of the embodiment in a case of receiving the reuse command from the host.

A flowchart of FIG. 26 illustrates yet another procedure of the processing executed by the controller 4 when the controller 4 receives the reuse command from the host 2.

The controller 4 receives various commands from the host 2 (step S61) and executes each of the received commands (step S62). For example, if the controller 4 receives from the host 2 each read command designating the block address of the read target block and the offset indicative of the read target storage location in the read target block, the controller 4 executes the data read operation in accordance with each of the received read commands.

If the command received from the host 2 is the reuse command (YES in step S63), the controller 4 determines whether the execution of all the received read commands designating the block address ELK #X designated by the reuse command and all the received copy commands designating the block address BLK #X as the copy source block address is completed or not (step S64). In step S64, the controller 4 can determine whether the execution of all the received read commands designating the block address BLK #X and all the received copy commands designating the block address BLK #X as the copy source block address is completed or not, by referring to the in-flight command number counter value corresponding to the block having the block address BLK #X or referring to the command queue.

If an incomplete read command designating the block address BLK #X or an incomplete copy command designating the block address BLK #X as the copy source block address exists (NO in step S64), the controller 4 does not execute the reuse command, but returns a response indicative of the failure of this reuse command (for example, an error notification indicating that the reuse command is an unauthorized command) to the host 2 (step S65). In response to receiving the response indicative of the failure of this reuse command, the host 2 may retransmit the reuse command to the flash storage device 3.

If the execution of all the read commands designating the block address BLK #X and all the copy commands designating the block address BLK #X as the copy source block address is completed (YES in step S64), the controller 4 executes this reuse command, and returns the block having the block address BLK #X to the common flash block pool 801 to set the block to be a reusable state of being reusable as a new write destination block for optional QoS domain (step S66).

If the block having the block address BLK #X is returned to the common flash block pool 801 and then a new read command designating the block address BLK #X of this block existing in the common flash block pool 801 is received from the host 2 (YES in step S67), the controller 4 does not execute the received new read command, but returns a response indicative of failure of the received new read command (for example, an error notification indicating that the read command is an unauthorized command) to the host 2 (step S68).

If a new copy command which designates the block address BLK #X of this block existing in the common flash block pool 801 as the copy source block address is received from the host 2, too, the controller 4 does not execute the received new copy command, but returns a response indicative of failure of the received new copy command (for example, an error notification indicating that the copy command is an unauthorized command) to the host 2.

The procedure of the processing executed in a case of receiving the reuse command is illustrated in the flowcharts of FIG. 23 to FIG. 26 but, if the erase command is received from the host 2, too, the same processing as the processing executed in a case of receiving the reuse command as illustrated in FIG. 23 to FIG. 26 is executed.

In addition, not only the above-described write command, but write commands of the following types can be used in the flash storage device 3 of the embodiment.

<Write Command to Designate Block Address>

The write command may include the command ID, the QoS domain ID, the physical address, the tag, the length, the write buffer address, and the like.

The command ID is an identifier unique to this command (i.e., this write command). The QoS domain ID is an identifier capable of uniquely identifying the QoS domain to which the data is to be written. A write command transmitted from the host 2 in response to a write request from an application corresponding to a certain end user includes the QoS domain ID designating the QoS domain corresponding to this end user.

The physical address designates a block address of the block to which the data is to be written, and does not designate a location in the block (for example, page address and page offset).

The tag is an identifier for identifying write data to be written. The tag may be a logical address such as LBA, a key of a key-value store or a hash value of this key, as described above.

The length is indicative of the length of the write data to be written. The length (data length) may be designated by the number of grain (Grain), the number of LBA, or the byte.

The write buffer address is indicative of a location in the host memory (write buffer of the host 2) where the write data to be written is stored. The write buffer address is also referred to as a data pointer.

When the controller 4 receives the write command from the host 2, the controller 4 determines the write destination location in the block having the block address designated by the write command. The write destination location is determined in consideration of the restrictions on page write order, the bad pages, and the like. Then, the controller 4 writes the data from the host 2 to the determined write destination location in the block having the block address designated by the write command.

In a case of using the write command of this type, the host 2 may require the flash storage device 3 to allocate the block for specific QoS domain by sending the block allocate command to the flash storage device 3. The block allocate command designates a QoS domain ID. If the controller 4 receives a block allocate command, the controller 4 selects one of blocks (free blocks) in the common block group 602 and allocates the selected block to this QoS domain as a write destination block. The controller 4 notifies the host 2 of the block address of the allocated block. The host 2 can transmit the write command designating the block address of the allocated block to the flash storage device 3.

<Write Command to Designate Block Address and Offset>

The write command may include the command ID, the QoS domain ID, the physical address, the tag, the length, the write buffer address, and the like.

The command ID is an identifier unique to this command (i.e., this write command). The QoS domain ID is an identifier capable of uniquely identifying the QoS domain to which the data is to be written. A write command transmitted from the host 2 in response to a write request from an application corresponding to a certain end user includes the QoS domain ID designating the QoS domain corresponding to this end user.

The physical address designates a block address of the block to which the data (write data) is to be written, and offset indicative of a write destination location in the block (for example, page address and page offset).

The tag is an identifier for identifying the write data to be written. The tag may be a logical address such as LBA, a key of a key-value store or a hash value of this key, as described above.

The length is indicative of the length of the write data to be written. The length (data length) may be designated by the number of grain (Grain), the number of LBA, or the byte.

The write buffer address is indicative of a location in the host memory (write buffer of the host 2) where the write data to be written is stored.

As described above, according to the embodiment, when the command (reuse command or erase command) to transition a block to which the data is already written to a state (reusable state) of being reusable as a new write destination block is received from the host 2, it is determined whether an incomplete read command already received from the host 2 and designating a block address of this block exists or not. In a case where the incomplete read command which designates the block address of this block exists, the command (reuse command or erase command) to transition this block to the reusable state is executed after the execution of the incomplete read command which designates the block address of this block is completed. Therefore, the host 2 can avoid the read command/reuse command (erase command) collision without executing the processing of controlling issue of a new command while checking completion of all of already issued commands. The burden on the host 2 side can be therefore reduced.

In addition, in the embodiment, if the command (reuse command or erase command) to transition the block to which the data is already written to a reusable state of being reusable as a new write destination block is received from the host 2, it is determined whether an incomplete read command already received from the host 2 and designating a block address of this block exists or not. If the incomplete read command which designates the block address of this block does not exist, the command (reuse command or erase command) to transition this block to a reusable state is executed. In contrast, if the incomplete read command which designates the block address of this block exists, the command (reuse command or erase command) to transition this block to a reusable state is not executed but a response indicative of failure of this command is returned to the host 2. Therefore, the host 2 can avoid the read command/reuse command (erase command) collision without executing the processing of controlling issue of a new command while checking completion of all of already issued commands.

In the present embodiment, the NAND flash memory has been illustrated as a nonvolatile memory. However, the functions of the present embodiment are also applicable to various other nonvolatile memories such as a magnetoresistive random access memory (MRAM), a phase change random access memory (PRAM), a resistive random access memory (ReRAM) and a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, the memory system comprising:
   a nonvolatile memory including a plurality of blocks; and
   a controller electrically connected to the nonvolatile memory and configured to receive from the host read commands each designating both of a block address of a read target block of the blocks and a read target storage location in the read target block, and to execute a data read operation in accordance with each of the received read commands, wherein
   the controller is configured to:
   manage a counter value indicative of the number of read commands already received from the host and incomplete, for each block to which data is already written;
   every time a read command is received from the host, increment a counter value corresponding to a block designated by a block address in the received read command by 1;

every time execution of the received read command is completed, decrement a counter value corresponding to a block designated by a block address in the complete read command by 1;

in response to receiving from the host a first command to transition a first block to which data is already written to a reusable state of being reusable as a new write destination block, determine whether an incomplete read command already received from the host and designating a block address of the first block exists or not, in accordance with whether a counter value corresponding to the first block is zero or not; and in a case where the incomplete read command designating the block address of the first block exists, execute the first command after execution of the incomplete read command designating the block address of the first block is completed.

2. The memory system of claim 1, wherein the controller is configured, when a new read command designating the block address of the first block is received from the host after the first block is transitioned to the reusable state of being reusable as the new write destination block, to return a response indicative of failure of the received new read command to the host without executing the received new read command.

3. The memory system of claim 1, wherein the controller is configured, when receiving from the host a write command designating a first identifier of a plurality of identifiers for accessing a plurality of regions each being a subset of the plurality of blocks, to allocate one of blocks of a common free block group shared by the plurality of regions as a write destination block for a region corresponding to the first identifier and to write data associated with the write command to the write destination block, and the first command is a command to return one of blocks allocated to one of the plural regions as the write destination block to the common free block group to set the block to be reusable as a new write destination block for any region, or a command to execute an erase operation for one of the plurality of blocks.

4. The memory system of claim 1, wherein the controller is configured, when receiving from the host the first command to transition the first block to the reusable state, to determine whether the incomplete read command already received from the host and designating the block address of the first block exists or not, by referring to a command queue in the controller where each of the incomplete commands is stored.

5. The memory system of claim 1, wherein the controller is configured to:

when receiving from the host the first command to transition the first block to the reusable state, further determine whether an incomplete copy command already received from the host and designating the block address of the first block as a block address of a copy source block exists or not; and execute the first command after execution of both of the incomplete read command designating the block address of the first block and the incomplete copy command designating the block address of the first block as the block address of the copy source block is completed.

6. A memory system connectable to a host, the memory system comprising:

a nonvolatile memory including a plurality of blocks; and a controller electrically connected to the nonvolatile memory and configured to receive from the host read commands each designating both of a block address of a read target block of the plurality of blocks and a read target storage location in the read target block, and to execute a data read operation in accordance with each of the received read commands, wherein the controller is configured to:

manage a counter value indicative of the number of read commands already received from the host and incomplete, for each block to which data is already written;

every time a read command is received from the host, increment a counter value corresponding to a block designated by a block address in the received read command by 1;

every time execution of the received read command is completed, decrement a counter value corresponding to a block designated by a block address in the complete read command by 1;

in response to receiving from the host a first command to transition a first block to which data is already written to a reusable state of being reusable as a new write destination block, determine whether an incomplete read command already received from the host and designating a block address of the first block exists or not, in accordance with whether a counter value corresponding to the first block is zero or not;

in a case where the incomplete read command designating the block address of the first block does not exist, execute the first command; and in a case where the incomplete read command designating the block address of the first block exists, return a response indicative of failure of the first command to the host without executing the first command.

7. The memory system of claim 6, wherein the controller is configured, when a new read command designating the block address of the first block is received from the host after the first block is transitioned to the reusable state of being reusable as the new write destination block, to return a response indicative of failure of the received new read command to the host without executing the received new read command.

8. The memory system of claim 6, wherein the controller is configured, when receiving from the host a write command designating a first identifier of a plurality of identifiers for accessing a plurality of regions each being a subset of the plurality of blocks, to allocate one of blocks of a common free block group shared by the plurality of regions as a write destination block for a region corresponding to the first identifier, and to write data associated with the write command to the write destination block, and the first command is a command to return one of blocks allocated to one of the plurality of regions as the write destination block to the common free block group to set the block to be reusable as a new write destination block for any optional region, or a command to execute an erase operation for one of the plurality of blocks.

9. The memory system of claim 6, wherein the controller is configured, when receiving from the host the first command to transition the first block to the reusable state, to determine whether the incomplete read command already received from the host and designating the block address of the first block exists or not, by referring to a command queue in the controller where each of the incomplete commands is stored.

10. The memory system of claim 6, wherein the controller is configured to:
when receiving from the host the first command to transition the first block to the reusable state, further determine whether an incomplete copy command already received from the host and designating the block address of the first block as a block address of a copy source block exists or not; and
in a case where the incomplete read command designating the block address of the first block or the incomplete copy command designating the block address of the first block as the block address of the copy source block exists, return a response indicative of failure of the first command to the host without executing the first command.

11. A method of controlling a nonvolatile memory including a plurality of blocks, the method comprising:
receiving from a host each read commands each designating both of a block address of a read target block of the plurality of blocks and a read target storage location in the read target block;
executing a data read operation in accordance with each of the received read commands;
managing a counter value indicative of the number of read commands already received from the host and incomplete, for each block to which data is already written;
every time a read command is received from the host, incrementing a counter value corresponding to a block designated by a block address in the received read command by 1;
every time execution of the received read command is completed, decrementing a counter value corresponding to a block designated by a block address in the complete read command by 1;
in response to receiving from the host a first command to transition a first block to which data is already written to a reusable state of being reusable as a new write destination block, determining whether an incomplete read command already received from the host and designating a block address of the first block exists or not, in accordance with whether a counter value corresponding to the first block is zero or not; and
in a case where the incomplete read command designating the block address of the first block exists, executing the first command after execution of the incomplete read command designating the block address of the first block is completed.

12. The method of claim 11, further comprising:
when a new read command designating the block address of the first block is received from the host after the first block is transitioned to the reusable state of being usable as the new write destination block, returning a response indicative of failure of the received new read command to the host without executing the received new read command.

13. The method of claim 11, further comprising:
when receiving from the host a write command designating a first identifier of a plurality of identifiers for accessing a plurality of regions each being a subset of the plurality of blocks, allocating one of blocks of a common free block group shared by the plurality of regions as a write destination block for a region corresponding to the first identifier, and writing data associated with the write command to the write destination block,
wherein the first command is a command to return one of blocks allocated to one of the plurality of regions as the write destination block to the common free block group to set the block to be reusable as a new write destination block for any region, or a command to execute an erase operation for one of the plurality of blocks.

* * * * *